US011019196B2

(12) United States Patent
Mousseau et al.

(10) Patent No.: US 11,019,196 B2
(45) Date of Patent: *May 25, 2021

(54) ADVANCED VOICE AND DATA OPERATIONS IN A MOBILE DATA COMMUNICATION DEVICE

(71) Applicant: BlackBerry Limited, Waterloo (CA)

(72) Inventors: Gary Phillip Mousseau, Waterloo (CA); David Paul Yach, Waterloo (CA); Mihal Lazaridis, Waterloo (CA); Harry Richmond Major, Waterloo (CA); Raymond Paul Vander Veen, Waterloo (CA); Atul Asthana, Markham (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,372

(22) Filed: Sep. 16, 2019

(65) Prior Publication Data

US 2020/0014793 A1 Jan. 9, 2020

Related U.S. Application Data

(63) Continuation of application No. 14/614,526, filed on Feb. 5, 2015, now Pat. No. 10,419,600, which is a (Continued)

(51) Int. Cl.

*H04M 1/64* (2006.01)
*H04M 1/72469* (2021.01)

(Continued)

(52) U.S. Cl.

CPC ....... *H04M 1/72469* (2021.01); *H04M 7/006* (2013.01); *H04M 7/0036* (2013.01);

(Continued)

(58) Field of Classification Search

CPC ........... H04M 1/72583; H04M 7/0036; H04M 7/006; H04M 2201/38; H04M 3/42059;

(Continued)

(56) References Cited

U.S. PATENT DOCUMENTS 4,028,733 A * 6/1977 Ulicki ................ G06K 17/0019 386/201
4,975,896 A * 12/1990 D'Agosto, III ... H04M 3/42314 369/25.01

(Continued)

FOREIGN PATENT DOCUMENTS

| | | |
|---|---|---|
| DE | 19961345 | 6/2001 |
| EP | 1096725 | 5/2001 |

(Continued)

OTHER PUBLICATIONS

Motorola, "AirMobile TM Wireless Comm Guide for cc:Mail" User Guide Version 1.0 Motorola Wireless Data Group, 1995, pp. 3-48, retrieved on Aug. 23, 2013.

(Continued)

*Primary Examiner* — Solomon G Bezuayehu
(74) *Attorney, Agent, or Firm* — Rowand LLP

(57) ABSTRACT

A system and method for integrating voice and data operations into a single mobile device capable of simultaneously performing data and voice actions. The mobile device working in a network capable of exchanging both cell phone calls and data items to the mobile device. By wearing an earphone or an ear-bud device the user is capable of dealing with voice conversations while working with data centric information related to the current caller. By providing a data-centric device with voice capabilities there is a new range of features that allow incoming data events to trigger outgoing voice events.

22 Claims, 18 Drawing Sheets

Related U.S. Application Data continuation of application No. 13/772,159, filed on Feb. 20, 2013, now Pat. No. 8,971,504, which is a continuation of application No. 11/458,843, filed on Jul. 20, 2006, now Pat. No. 8,406,389, which is a continuation of application No. 10/890,824, filed on Jul. 14, 2004, now Pat. No. 7,096,009, which is a continuation-in-part of application No. 10/095,603, filed on Mar. 11, 2002, now Pat. No. 7,295,836.

(60) Provisional application No. 60/274,508, filed on Mar. 9, 2001.

(51) Int. Cl.
*H04M 7/00* (2006.01)
*H04W 88/06* (2009.01)
*H04M 3/42* (2006.01)
*H04M 3/436* (2006.01)
*H04M 3/56* (2006.01)

(52) U.S. Cl.
CPC ........ *H04W 88/06* (2013.01); *H04M 3/42059* (2013.01); *H04M 3/436* (2013.01); *H04M 3/56* (2013.01); *H04M 2201/38* (2013.01); *H04M 2207/18* (2013.01)

(58) Field of Classification Search
CPC .... H04M 2207/18; H04M 3/436; H04M 3/56; H04W 88/06
See application file for complete search history.

(56) References Cited

U.S. PATENT DOCUMENTS 5,065,309 A 11/1991 Putnam et al.
5,548,789 A 8/1996 Nakanura
5,557,659 A 9/1996 Hyde-Thompson
5,559,862 A 9/1996 Bhagat et al.
5,663,808 A * 9/1997 Park ..................... H04N 1/327 358/440
5,764,899 A 5/1998 Eggleston et al.
5,767,786 A * 6/1998 Lopatukhin .......... G08B 3/1033 340/7.1
5,771,353 A 6/1998 Eggleston et al.
5,806,000 A 9/1998 Vo et al.
5,812,773 A 9/1998 Norin
5,875,232 A 2/1999 Wolf
5,881,235 A 3/1999 Mills
5,930,700 A 7/1999 Pepper et al.
5,943,426 A 8/1999 Frith et al.
5,946,381 A 8/1999 Danne et al.
5,958,006 A 9/1999 Eggleston et al.
5,966,652 A 10/1999 Coad et al.
5,982,866 A 11/1999 Kowalski
6,009,173 A 12/1999 Sumner
6,035,214 A 3/2000 Henderson
6,049,796 A * 4/2000 Siitonen .............. G06F 15/0283 707/711
6,052,442 A 4/2000 Cooper et al.
6,065,012 A 5/2000 Balsara et al.
6,067,561 A 5/2000 Dillon
6,072,862 A 6/2000 Srinivason
6,073,137 A 6/2000 Brown et al.
6,112,244 A 8/2000 Moore et al.
6,119,167 A 9/2000 Boyle et al.
6,169,911 B1 1/2001 Wagner et al.
6,184,796 B1 * 2/2001 Rivero .................. H04M 1/275 340/407.1
6,219,694 B1 4/2001 Lazaridis et al.
6,289,212 B1 9/2001 Stein et al.
6,289,373 B1 * 9/2001 Dezonno ................. H04L 51/14 709/200
6,298,128 B1 10/2001 Ramey et al.
6,314,108 B1 11/2001 Ramasubramani et al.
6,324,587 B1 11/2001 Trenbeath et al.
6,332,044 B1 12/2001 Swartz et al.
6,333,973 B1 12/2001 Smith et al.
6,360,272 B1 3/2002 Lincke et al.
6,366,578 B1 4/2002 Johnson
6,389,124 B1 5/2002 Schnarel et al.
6,389,455 B1 5/2002 Fuisz
6,389,457 B2 5/2002 Lazaridis et al.
6,401,113 B2 6/2002 Lazaridis et al.
6,438,585 B2 8/2002 Mousseau et al.
6,442,251 B1 8/2002 Maes et al.
6,449,287 B1 9/2002 Leuca et al.
6,463,463 B1 10/2002 Godfrey et al.
6,463,464 B1 10/2002 Lazaridis et al.
6,470,358 B1 10/2002 Beyda et al.
6,487,560 B1 11/2002 Larue et al.
6,516,203 B1 2/2003 Enzmann et al.
6,519,252 B2 2/2003 Sallberg
6,526,042 B1 2/2003 Pinard et al.
6,603,848 B1 8/2003 Winnett
6,640,230 B1 10/2003 Alexander et al.
6,687,242 B1 2/2004 Enzmann et al.
6,701,378 B1 3/2004 Gilhuly et al.
6,711,401 B1 3/2004 Chow et al.
6,714,315 B1 * 3/2004 Yoshida .............. H04L 12/5692 358/1.18
6,785,379 B1 8/2004 Rogers et al.
6,798,872 B1 9/2004 Matsumoto et al.
6,804,334 B1 10/2004 Beasley et al.
6,865,161 B1 3/2005 Sponaugle et al.
6,888,927 B1 5/2005 Cruickshank et al.
6,917,610 B1 7/2005 Kung et al.
7,005,963 B1 2/2006 Scalisi et al.
7,085,257 B1 8/2006 Karves et al.
7,136,475 B1 11/2006 Rogers et al.
7,251,318 B1 7/2007 Henderson
7,330,883 B1 * 2/2008 Jessup ..................... H04W 4/02 709/224
2001/0015977 A1 8/2001 Johansson
2001/0045885 A1 11/2001 Tett
2002/0059380 A1 5/2002 Biliris et al.
2002/0065820 A1 5/2002 Enns
2002/0076109 A1 6/2002 Hertzfeld et al.
2002/0111813 A1 * 8/2002 Capps ................. G06F 16/3334 705/1.1
2002/0126814 A1 9/2002 Awada et al.
2004/0223593 A1 11/2004 Timmins et al.
2006/0094404 A1 5/2006 Burgess

FOREIGN PATENT DOCUMENTS

| | | |
|---|---|---|
| GB | 2335824 | 9/1999 |
| WO | 97/19251 | 12/1997 |
| WO | 99/12365 | 3/1999 |
| WO | 00/31931 | 6/2000 |
| WO | 00/41359 | 7/2000 |
| WO | 01/13656 | 2/2001 |
| WO | 01/22669 | 3/2001 |
| WO | 01/41472 | 6/2001 |
| WO | 01/67716 | 9/2001 |

OTHER PUBLICATIONS

Motorola, “AirMobile TM Wireless Comm Server for cc:Mail” User Guide Version 1.1 Motorola Wireless Data Group, 1995, pp. 4-46, retrieved on Aug. 23, 2013.
Sun Microsystem, JavaMail API Design Specification, Version 1.0, Sun Microsystems, Inc., chapters 1-10 appendices A-E., retrieved on Dec. 9, 1997.
Compaq, Aero 2100 Series Color Palm-Size PC Reference Guide, Second Edition , Aug. 1999, Compaq Corporation.
Takahashi, Y. et al.“Communication Method with Data Compression and Encryption for Mobile Computing Environment”, Proceedings of INET96, Montreal, Canada, Jun. 24-28, 1996, Transforming Our Society Now., retrieved on Oct. 14, 2003.

(56) References Cited

OTHER PUBLICATIONS

United States District Court, Northern District of California, San Francisco Division, *Good Technology, Inc.* v. *Research in Motion Limited, et al.* Case No. C02-2348 MJJ, dated Jan. 16, 2004.
Perkins, C. "RFC 2002—IP Mobility Suport," IBM, Oct. 1996, 61 pages, retrieved on Jan. 15, 2004.
Johnson, D., "Scalable Support for Transparent Mobile Host Internetworking", Wireless Networks, The Journal of Mobile Communication, Computation and Information. vol. 1, No. 3, Oct. 1995, pp. 311-321, retrieved on Aug. 23, 2013.
Dawson, F. et al., "Calendar Message-Based Interoperability Protocol (iMIP)," Standards Track, RFC 2447, iMIP, Nov. 1998, 4 pages XP-002249002, retrieved on Aug. 23, 2013.
Nelson, M. "Wireless Data Services: Here and Now,"PDS Developers 206, Nov./Dec. 1994, 3 pages, retrieved on Aug. 23, 2013.
Nokia: Electronic user's guide, http://nds1.nokia.com/phones/files/guides/6150_usersguide_en.pdf, dated Apr. 7, 1998.

* cited by examiner

ADVANCED VOICE AND DATA OPERATIONS IN A MOBILE DATA COMMUNICATION DEVICE

FIELD OF THE INVENTION

The present invention relates to methods of integrating voice and data operations into a single mobile data communications device that is capable of supporting both voice and data simultaneously.

BACKGROUND OF THE INVENTION

There are very few systems that have integrated a single mobile communications device into one physical unit. Those devices that do exist have not taken a data-centric approach to the problem, they have taken a voice-centric approach to the problem. What this means is that any previous integrated device normally started with the voice component and added on the data component as a separate distinct element. As such, the devices have not offered integration of the voice and data components beyond allowing the user to open an address book and place a phone call to the person specified in the address book entry. Many of today's current advanced phones have this simple feature, but none of them have examined the problem of integrating voice into a data-centric device.

There remains a need for integrated voice and data device that can handle interaction between voice and data events seamlessly and easily for the user. Moreover, there is also a need to allow the user to perform both voice and data actions simultaneously to gain even greater advantage when doing voice or data actions.

It is, therefore, desirable to provide a dual mode mobile device that integrates a voice component into the functionality of the data portion.

SUMMARY OF THE INVENTION

It is an object of the present invention to obviate or mitigate at least one disadvantage of previous dual mode mobile devices, and the method of integrating voice and data functions on them.

The present invention provides advanced data and voice operations in a dual mode mobile device. The present invention permits the performance of address lookups and phone calls based on incoming e-mail messages, calendar appointments, todo list tasks, and other data items. The invention includes the ability to perform a lookup of the address book data based on incoming caller id and direct inward dialing information. The invention includes the ability to create a memo-pad entry of caller log of incoming phone calls. The invention includes the ability to perform advanced multi-way conference calls by using a calendar entry or other data item that stores the telephone numbers to be joined in the conference. The invention includes the use of a single message center to keep track of all incoming data and voice events into a personal activity log on the device.

In a first aspect, the present invention provides a method for initiating a telephone call using a dual mode mobile device that has data and voice components. The data component of the dual mode mobile device stores, retrieves, receives and displays data. The voice component establishes telephone calls. The method includes the steps of receiving a data item, identifying a phone number associated with the data item and then initiating a telephone call to the associated phone number.

In an embodiment of this aspect of the present invention the step of receiving the data item includes the step of receiving data items from a computer associated with the mobile device. In alternate embodiments the data item is one of an email message, a calendar appointment and an item on a to do list. The step of identifying the phone number optionally includes reading a phone number embedded in the data item, or alternatively can include referencing a phone number, associated with identifying information embedded in the data item, in an address book, that can reside either in the mobile device, or in a computer associated with the mobile device.

The step of identifying the phone number can include the step of selecting a field in the email message, any field may include cross-referencing the selected field with an email address field or a name entry in an address book. Alternatively the step of including may include parsing the selected field to identify a phone number, wherein the parsing may include mapping alphabetic characters to a phone number. In an embodiment of the present invention, the step of identifying further includes the step of selecting a phone number from a plurality of numbers associated with the data item. In another embodiment a plurality of numbers are selected, and the initiation of the telephone call includes the initiation of a conference call. In the above embodiments the telephone call can be established using a communications channel on a cellular phone network, or it can be established using a communications channel with a data based network using a voice-over-packet data session.

In a further aspect of the present invention there is provided a method of presenting caller information on a dual mode mobile device having data and voice components. The mobile device has a set of call preferences and applications, and the data component is for storing, retrieving, receiving, and displaying data. The voice component for receiving telephone calls. The method comprises receiving a voice call containing caller identification information, determining the data component application to launch based on the call preferences and launching the determined data component application. In embodiments of the present aspect of the invention the set of call preferences maps different incoming numbers to different applications, or prompts the user for an application to launch. The applications include at least one of a calendar, call log, address book and email client. In a subsequent embodiment of the invention the caller identification information includes an originating phone number, and may optionally include a caller name. This information is typically provided to the application launched, and may be supplemented by information in an address book entry that is associated with the caller identification information. In some embodiments, the receipt of a call creates a calendar appointment, alternatively the call log records the caller identification information in an editable format. In alternate embodiments, the address book presents the address information associated with the caller identification information, or creates a new address book entry to store information associated with the caller identification information. In a further embodiment the email client creates an email message addressed to and address associated with the caller identification information.

A third aspect of the present invention provides a dual mode mobile device connected to a data packet network. This device comprises a data component for storing, retrieving, receiving and displaying data including e-mail messages, calendar appointments, address information, for launching applications associated with the data, and for connecting to the data packet network for sending and receiving data, and a voice component, connected to the data component for receiving call initiation information, the voice component for initiating and receiving telephone calls, and caller identification information, and for providing the received caller identification information to the data component for cross reference to the data. In an embodiment of this aspect of the present invention the voice component is connected to a telephone network for initiating and receiving telephone calls, where the telephone network can be a cellular telephone network. In other embodiments of the invention the data packet network is a wireless data packet network, and the voice component can be connected to the data packet network for receiving and initiating telephone calls using Voice over Packet data channels. In a further embodiment the data component has a preferences table that determines an application to launch upon receiving caller identification information from the voice component, and the voice component initiates a telephone call upon receiving call initiation information from the data component. In yet another embodiment of the present invention the data component is additionally for establishing data communication channels with a computer over the data network to transfer data.

In an alternate aspect of the present invention there is provided a method of synchronising data between a computer and mobile device. The computer and mobile device are connected by a wireless network, and are intermittently connected by a physical link. The method comprises the steps of interrogating the physical link to determine if a connection is present, synchronising the data of the computer and the mobile device using the physical link when the physical link is available and synchronising the data of the computer and the mobile device using the wireless network connection when the physical link is unavailable.

In a further aspect of the invention there is provided a wireless connector, operatively connected to a computer having data and associated with a mobile device, for routing data between the computer and mobile device, to a wireless network for connecting to the mobile device associated with the computer, and to a cradle for intermittently connecting to the mobile device. The wireless connector comprises cradle interrogation means for determining the status of the connection between the cradle and the mobile device, cradle mobile device transfer means, operatively connected to the cradle interrogation means and the cradle, for routing data from the computer to the mobile device through the cradle when the cradle interrogating means indicate that the mobile device is connected to the cradle and wireless mobile device transfer means, operatively connected to the cradle interrogation means and the wireless network, for routing data from the computer to the mobile device through the wireless network when the cradle interrogating means indicate that the mobile device is not connected to the cradle.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for transferring instructions (such as telephone call instructions) and information between the data and voice components of a dual mode mobile device. Additionally, the present invention provides a method and system for synchronizing data between a computer and mobile device using a cradle when possible, and a wireless data network when necessary.

Figure 1:
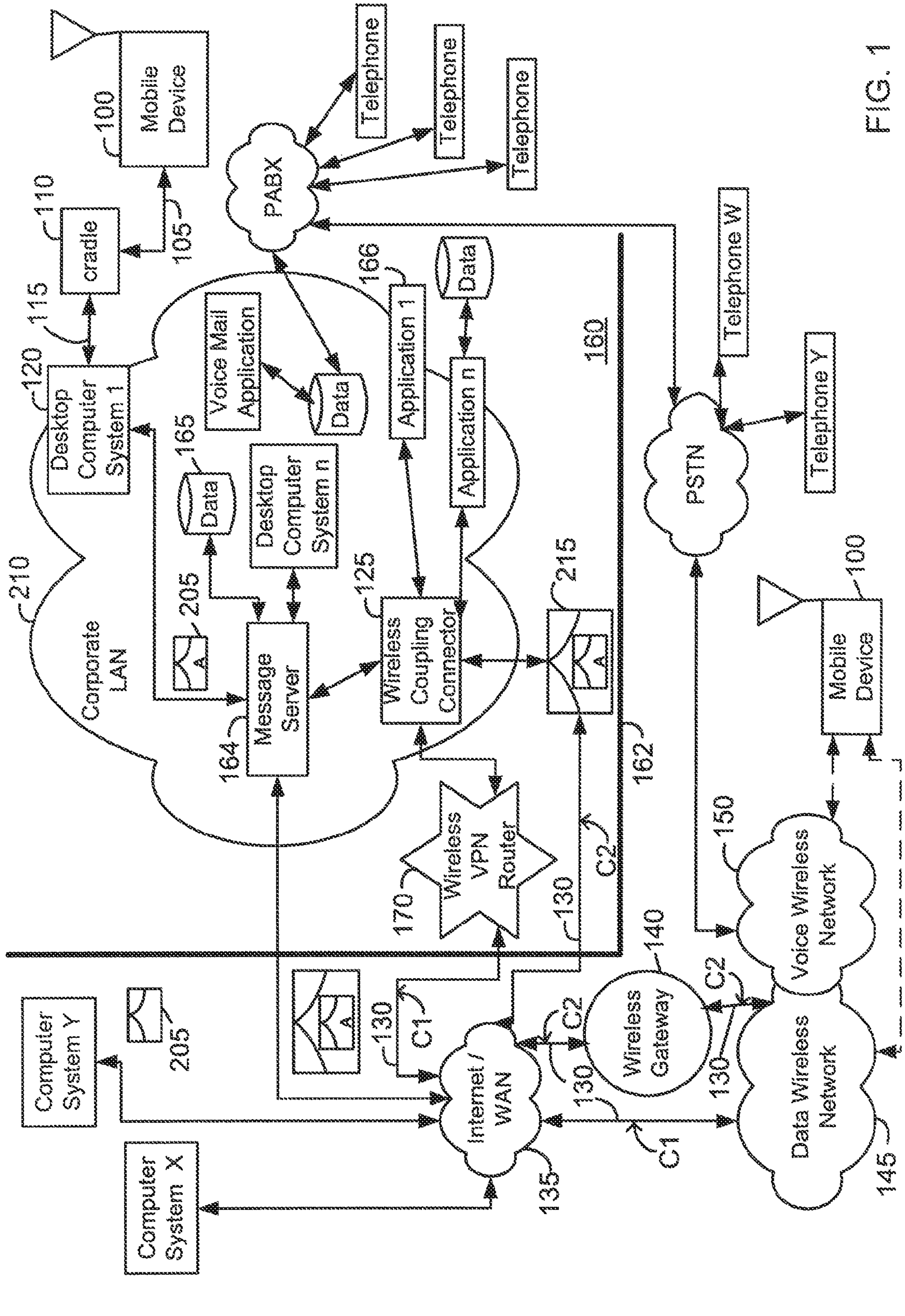
FIG. 1 is a system schematic of the voice and data environments in which the mobile device is used.

With reference to FIG. 1 this overview diagram illustrates an environment for the invention to operate in. The invention uses a method of data transfer to send data items from a host system 160 to a mobile data communication device (mobile device) 100 which is also referred to as a mobile computer or a mobile computing device, over a communication channel 130. The same channel is used to exchange data items between a wireless connector program 125 and the mobile device 100 in order to interact with office systems such as message servers 164, e-mail applications, voice-mail applications 166, intranet data, database engines, Customer Reference Management (CRM) data, SAP data and other forms of information. The mobile device 100 is also capable of connecting to a cradle 110, which is connected to a computer 120, to exchange information. The cradle 110 is used to provide a high bandwidth physically secure connection between mobile device 100 and computer 120. When the cradle 110 is used for data transfer, the mobile device 100 can be populated with data such as Personal Information Management (PIM) data, that is saved and accumulated in the desktop computer 120 or a data store coupled to the local area network. Another aspect of the mobile device 100 is a connection to a wireless network 150 such as a cellular-phone network that utilizes protocols such as Time Division Multiple Access (TDMA), Code Division Multiple Access (CDMA), Global System for Mobile Communications (GSM) and General Packet Radio Service (GPRS). The data and voice communication modes are not mutually exclusive and may operate simultaneously on the same mobile device.

A method for connecting the data component of dual mode mobile device 100 and computer 120 is provided in U.S. patent application Ser. No. 09/087,632, titled "System and Method for Pushing Information from a Host System to a Mobile Data Communication Device," filed on May 29, 1998, which is incorporated by reference. By using this previous invention the dynamic arrival of data items onto the device makes advanced and integrated control even more important and easy to achieve. This is because this invention discloses a system that mirrors the user's corporate data environment, and hence all their contact and phone information. As this information gets sent and mailed around the corporation, it is much easier to act upon it and perform advanced functions.

FIG. 1 shows how a network node used for sending data via a wireless network, herein referred to as wireless connector 125, can be used to provide a more fully rounded data centric solution. Wireless connector 125, which in a presently preferred embodiment is event-driven, can operate as software running on computer 120 as illustrated in the embodiment of FIG. 1, or it could be another entity at host location 160, coupled to a message server and/or voice mail application which in turn is coupled to one or more computers 120 via a corporate LAN. When a user-defined event has occurred, wireless connector 125 transmits user-selected data items 205 from the computer 120 to mobile device 100. A non exhaustive list of data items that can be sent to mobile device 100 includes e-mail messages, voice-mail indications, calendar events, to do lists, address book entries, work items or other personal information (PIM) data. This pushed data can be input by the user, or by another, and is typically time sensitive data entered into computer 120 in advance of the even that triggers wireless connector 125. Wireless connector 125 can interface with cradle device 110, over connection 115 so that it can detect if the mobile device 100 is in communication with cradle 110. Connection 115 in presently preferred embodiments can be a serial, infra-red (IR), RF or network connection. Cradle 110 provides a physical link 105 for the mobile computer 100 that allows the user to dock the mobile computer 100 when they are in the office. This docking process is one method for exchange bulk personal information, can also provide other information such as security information, which in one embodiment includes encryption keys. The cradle 110 also informs the wireless connector program 125 when the mobile device 100 is not in the cradle and therefore should be reached by the data-centric wireless network 145.

In the illustrated embodiment of FIG. 1, the wireless connector 125 is coupled to an external network 135, directly via physical link 130. Optionally between wireless connector 125 and network 135 there may be a special router such as wireless VPN router 170. External network 135 could be any range of networks including but not limited to the Internet, a company intranet, an corporate extranet, a private network such as that operated by America On Line ("AOL"®), an X.25 network, or some other network such as a local area network (LAN) or wide area network (WAN). In a presently preferred embodiment, network 135 is capable of exchanging information at extremely high rates. Similarly, physical connection 130 could use a range of existing technologies including but not limited to Ethernet, as described in either the IEEE 802.3 specification as a 10 Mbps, 100 Mbps, or gigabit system, or any of the variety of IEEE 802.11 standards, Cable Modem, DSL, ISDN, Frame Relay or PSTN, running over any number of physical cables such as high capacity copper cables such as T1 lines or high bandwidth fiber optic cables. One of skill in the art will readily recognize that many other such standard and non-standard communication lines can be used without departing from the scope of the present invention. By coupling network 135 to either the wireless connector 125 directly or via the wireless VPN router 170, another path is established to allow computer 120 to connect to the mobile device 100 while it is not attached to cradle 110.

The main advantage of using wireless VPN router 170 is that it could be an off-the-shelf component, and could be integrated with wireless gateway 140. In a presently preferred embodiment, the VPN connection would use a TCP/IP based connection to deliver the messages to the mobile device 100. In an alternate embodiment, UDP/IP connection can be used. As shown in FIG. 1, many current wireless networks, require wireless gateway 140 to be present. Wireless gateway 140 acts as a coupler between the Internet 135 and the data-centric wireless network 145. Wireless gateway 140 mitigates problems that may arise from packet size and network speed differences between Internet 135 and the data-centric wireless network 145. Typically, this is done through the use of buffers and packet fragmentation. In conjunction with wireless connector 125, wireless gateway 140 can provide push support for dynamically sending data to mobile device 100. To implement push services wireless gateway 140 performs routing and addressing functions, specifically ensuring that a valid address for mobile device 100 always exists so that wireless connector 125 can locate it and information can be sent to mobile device 100 at any time. Once data is delivered to the data-centric wireless network 145, it can be routed to the mobile device 100 and received via link 155. Link 155 is typically an RF connection.

In a presently preferred embodiment, wireless connector 125 is a computer program designed to dynamically encode information (using a re-enveloping technique) from the computer 120 for delivery to the mobile device 100. This data transfer technique can take place through either cradle 110, or over data-centric wireless network 145. In an alternative embodiment, data sent from the host system to the device 100 via the wireless network 145 may be in response to a user-initiated command transmitted from the device for such data transmission to the device. In this manner, the data may be "pulled" to the device. In yet another embodiment, data sent from the host system to the device 100 via the wireless network 145 may be in response to predetermined timers, or polling into data store for detecting changes to a data store. If a change is detected and it is determined that change or the new resulting data is desired at the mobile device, the data is to be sent via network 145.

In a presently preferred embodiment data transmission through wireless network 145 is performed in a secure fashion. During its initialization mobile device 100 can exchange encryption keys (such as symmetric encryption keys) with wireless connector 125. This exchange of keys cannot be performed over an RF connection if the keys are to remain confidential as the physical RF channel is insecure and would require network layer encryption which cannot be facilitated without an initial key exchange. The symmetric key can be used later to encrypt all data items being exchanged between the wireless connector 125 and the mobile device 100. In an alternate embodiment, in lieu of the initial exchange of symmetric keys, the mobile device 100 and wireless connector 125 provide each other with the public key of an asymmetric key pair, so that an initialization over an insecure physical channel such as an RF link can be provided. The wireless connector 125 also has the ability to compress the information to varying degrees, depending on the type and bandwidth of the connection used. For one skilled in the art it will be clear that wireless connector 125 can connect to a range of devices like voice-mail systems, home or office alarm systems, motion detectors, Internet web sites, e-mail message stores, and customer databases as well as other information sources to collect information to push to the mobile device 100.

Host location 160 is, in one embodiment, the network protected by at least the firewall 162, that computer 120 resides on, in the absence of a networked computer 120, it is computer 120 and all directly attached peripherals. It is anticipated that a cradle 110 could be connected to computer 120 by a network connection through a hub, or other networking device, or that the cradle 110 would be connected to computer 120, by another computer attached to the network, host location 160. In a preferred embodiment, computer 120 is in a business office or a home office associated with the user of mobile device 100. This office contains computer 120 which has access to the user's personal information manager (PIM) and personal e-mail information along with other data. In alternative embodiments host location 160 could also be a primary data center, Internet Service Provider (ISP), network carrier data communication facilities that securely holds user information and facilitates, data and voice communication. In an advanced embodiment the user has the ability to enable several paths for wireless connector 125 to access their personal information and transmit it to mobile device 100.

In all cases, the term host system, home system, desktop system and computer 120 refers to an information source where wireless connector 125 gets information to send to mobile device 100, via a wireless network. The wireless connector 125 does not necessarily have to be integrated with the computer 120, but could also be coupled to computer 120 via a LAN, WAN, VPN or some other communications method. The host system is most commonly viewed as residing behind a firewall where a myriad of data items are exchanged, such as voice calls, voice mail, e-mail, corporate documents, database files, video conferences and a large range of other data.

The term wireless network has been used in two contexts (1) the data-centric wireless network and (2) the voice-centric wireless network. However in the coming months and years these two networks are merging into one single network that can support both voice and data communications over the same physical network. The newest of these combined networks include, but are not limited to CDMA networks GSM and GPRS networks and future so-called third-generation networks like EDGE and UMTS.

Also illustrated in FIG. 1 presents an illustration of the data exchanges and relationships between the various components of the system. FIG. 1 illustrates how various types of data (such as e-mail messages, summaries of voice mail messages, etc.) are re-packaged 215 and sent via the wireless network to the mobile device 100. This process of sending personal information for the user, combined with the voice component of the mobile device creates a unique synergy.

In this illustration computer 120 is coupled to LAN 210. Each workstation on LAN 210 has a connection to the network server for whatever common, shared services might exist. It is well known in the art that the LAN can extend to remote branch offices and other countries using Virtual Private Networks (VPNs) and other advanced wide-area networking technology. In this context LAN 210 preferably exists behind a firewall 162, no matter how far that extends.

In this illustrative example a wireless connector 125 operates at computer 120 or at a network server where data items 205 are received. When wireless connector 125 is configured to reside on a network, wireless connector 125 can monitor the data items 205 for many users across several workstations simultaneously. The data items 205 can originate from Internet sources 135, from other LAN workstations 210 or from external data sources. Data items 205 include: phone calls, e-mail, corporate inventory records, corporate sales projects, corporate sales and marketing forms, company field service records, company call dispatch requests, real-time phone calls, instant messages from instant messaging gateways, company or home alarm data, motion and video sensors, heart monitors and vital statistic monitors, fluid levels and large equipment feedback data. The other product in the computer industry, which makes the 'unified data items' concept shown in FIG. 1 easier to understand, is the universal inbox or the unified messaging product offerings. There is a new class of software products that are being seen as 'add-ons' to the desktop, with their sole purpose being to unify the desktop information sources by using a single location for all notifications to a user. One example of this is Octel™ Unified Messenger™ product and Call Pilot™ product, both operable with a PABX system and available to operate with a message server 164 such as Microsoft™ Exchange or Lotus Domino. These products can already delivery voice messages into the user's e-mail inbox for later retrieval and manipulation via the user's desktop computer and the user never has to touch the phone to replay the message. Data switches can open up a phone connection on a TCP/IP connection, also called Voice over IP (VoIP). A VoIP connection from a workstation over data-centric wireless network 145 to mobile device 100 can be established as an alternate to the use of a voice network. It is possible that a VoIP connection could be re-routed directly to the mobile device 100 by wireless connector 125, either via a voice channel or via a data channel. Making this connection over a data channel in wireless network 145 will require high data transfer rates. VoIP connections are one of a class of connections referred to as Voice over Packet connections. One of skill in the art will readily appreciate that the above discussion is not limiting the scope of the invention to VoIP connections, and instead any connection of the broader VoP class of connections can be easily adapted for use with mobile device 100.

An example is now described. First, the origination of data items 205 may occur on a computer system Y connected to the Internet 135, the data items 205 may then flow into the corporate environment through the firewall 162 and are stored at a data store 165 associated with the message server 164. Similar data items (not shown) may also be stored at the data store 165 that are generated at one of a plurality of workstations coupled to the corporate LAN. Alternatively, a data store may be at each desktop computer 120.

Second, when the wireless connector software 125 detects the data items 205 at the data store 165 desktop workstation or network server 120 and it matches the forwarding criteria set up by the user. The user has direct control at their workstation to limit, filter and monitor all data items 205 that could be sent, via the wireless network 145, to their mobile computer 100. The wireless connector program 125 uses all available information and resources to determine; (a) when to send, via the wireless network 145, data items 205 based on triggers like location information, heat sensors, motion detectors and screen savers, (b) configured information from the user like filters, desired data types 205 and mobile computer 100 capabilities, and finally the continuous arrival of these data items 205.

Finally in step (C1) or (C2) the wireless connector 125 re-envelopes the data items 215 so that complete transparency is maintained for the sender and the receiver of the message. This also means that all addressing information, subjects and content is kept intact provided the mobile device can support all elements of the original data item 205. FIG. 2 shows both mail messages or phone calls 205 arriving to the desktop workstation or network server 120, but the numbers and types of data items 205 are not limited to only these types. Once the original data item 205 is re-enveloped as data item with reference 215 and this re-enveloped data item is delivered along a path to the data-centric wireless network 145. The re-enveloping of data item 205 into data item 215 may result in data item 215 capable of transmission via TCP/IP. There are at least two possible paths. These paths are shown as (C1) and (C2), although others could also be possible. In a first embodiment, the data is sent via the Internet to a wireless gateway 140, labeled C2. A wireless gateway 140 is often used to improve the speed and quality of the delivery of data items 205 over the data-centric wireless network to the mobile computer 100. It may act as temporary data store of information exchanged, via the wireless network, between the host system 160 and the mobile device 100. Alternatively the data could also be sent using a wireless Virtual Private Network (VPN) router to the mobile device 100 over the Internet 135, labeled C1. A person skilled in the art would also appreciate that there may be many other methods to reach a data-centric wireless network 145 other then the Internet 135 such as a private, dedicated point-to-point connection, like PSTN, ISDN or Frame Relay. The step of traversing through paths (C1) or (C2) may be optionally skipped when the device is docked at its serial cradle which is in communication with a desktop computer system 120 via communication link 105. In such an instance, the user may not want any data items 215 forward to the mobile computer 100 when they are sitting at their desktop computer system.

The present invention allows data to be securely sent via a wireless network to the mobile device 100, when criteria are met, it provides data sending from numerous data types including phone calls, email and data on a secure network. This communications method allows user mobility, as the user's data follows him wherever he travels. Since all of these steps take place securely, from behind a firewall 162, it is completely suitable for an environment with sensitive data. This re-enveloping technique allows for full compression and encryption to take place before it leaves wireless connector 125 to the mobile device 100. For those skilled in the art, the firewall 162 is generally acknowledged as a reasonable security wall that keeps Intranet-based information secure from the prying eyes of public Internet users. One of skill in the art will readily appreciate that numerous modifications to the technique of data pushing can be easily implemented without departing from the scope of the present invention. Additionally, one of skill in the art will appreciate that the above lists of data types that can be sent, via a wireless network, to the mobile device is merely exemplary, and should not be viewed as exhaustive.

Although not shown, a person with a set of earphones running from the mobile device 100 up to their ears. One of skill in the art will recognize that the hands free headset can be varied with numerous similar devices known in the art. An advantage if the hands free headset is that as the user talks she has her hands free to type, perform touch-screen actions and perform menu selections on mobile device 100. This allows her to deal with voice and data issues simultaneously, whether or not the issues are related. For example the user might receive a call from Person Y, and decide to send an unrelated message to Person W while still engaged with the call, to save time. Alternatively, the user might receive e-mail from Person Y, and decide to call Person Y after reading the e-mail to deal with an urgent matter.

Turning now to FIG. 2 this is an illustration of some components of a mobile device 100 and how the arrival of a data message 430 can cause the initiation of a voice call connection by the voice component of the mobile device. In this exemplary illustration, an incoming message 430 triggers logic on the mobile device 100 that enables the user to automatically call back the sender or another number that might appear within the subject or body of the message. The call-back feature can cross-reference the sender's email address to one of a plurality of numbers in the PIM data stored in either a data store 165' at mobile device 100 or the data store 165 at host system 160 (not shown).

FIG. 2 the first step is a message with contents 'A' leaving Person Y's desktop computer system (shown in FIG. 1) destined to reach the data store 165 of computer 120 which is associated with mobile device 100. The message 420 is analogous to data 205 in FIG. 1 as message 405 is considered just another data item as it arrives, and is provided to wireless connector 125. Within the company's corporate LAN environment the message 420 is then compressed, encrypted and re-enveloped, the re-enveloped message is shown as incoming data message 430, before it is sent, via the wireless network 145, to the mobile device 100. The next step is the delivery of message 'A' through the data-based wireless network 145 to the mobile device 100. Depending on the network the data-based wireless network 145 and voice-based wireless network 150 can be integrated, as is the case for GSM and GPRS, or superimposed upon each other.

Figure 2A:
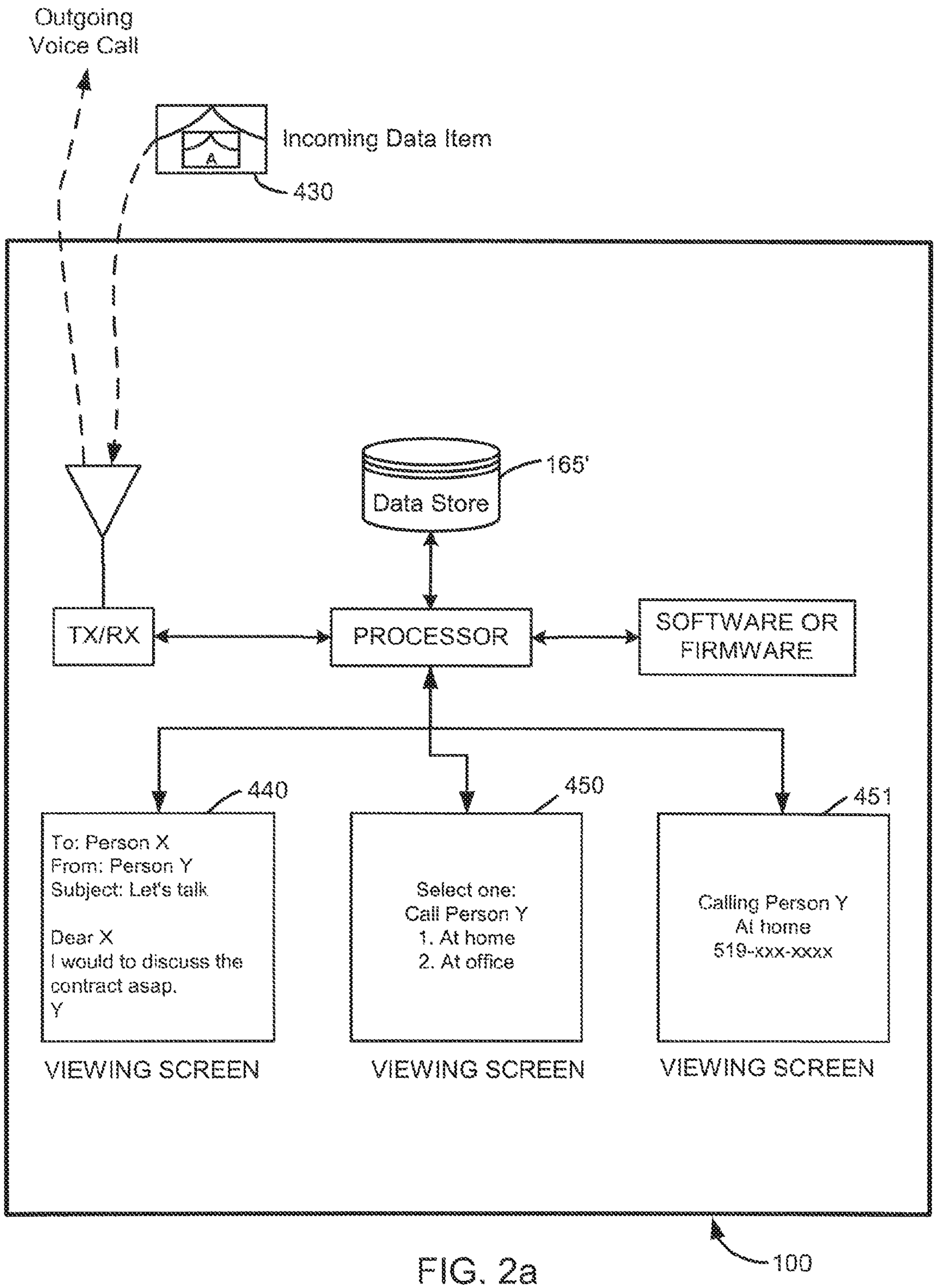
FIG. 2*a* is an illustration of a system and method of placing an outgoing phone call to a number associated with a field in an e-mail message.
Figure 2B:
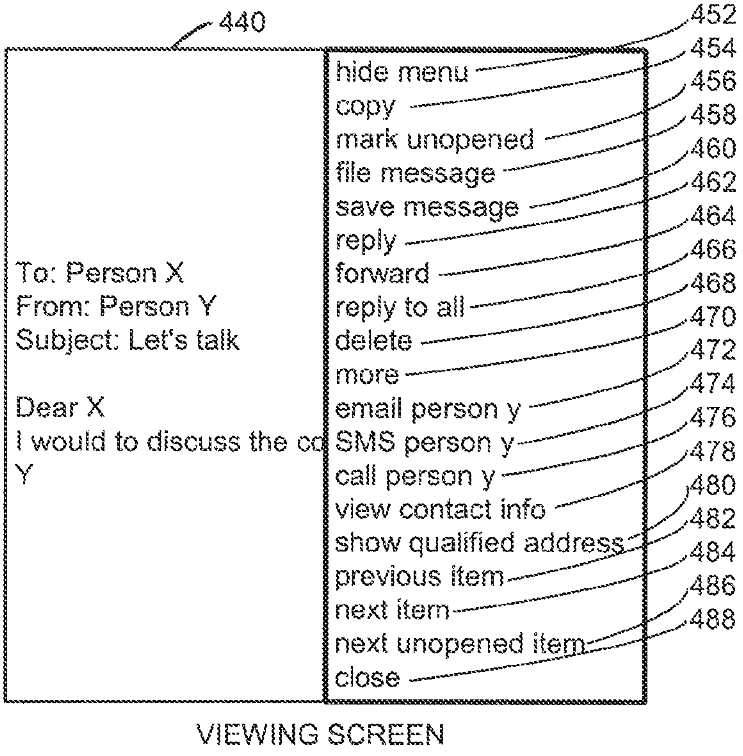
FIG. 2*b* is an illustration of a graphical user interface of a selection action menu.

Once the message is received by mobile device 100 the user is preferably notified and the message is opened for viewing on the display of the device so that to the user may start reading the contents 440 of message A. The message could be an email message, a calendar message, a memo-pad message or any other PIM message that could contain relevant information to the user. This is an example of the presently preferred embodiment of the invention when an e-mail message is transmitted to and received by mobile device 100. When a software or firmware module is displaying the e-mail message, as with most incoming data such as calendar or meeting requests, the message will have a sender, indicated in this example by the underlined 'From: Person Y' line item. Preferably, the user of the mobile device may scroll through the message he is viewing by one or more navigation means, including but not limited to roller-wheels, thumbwheels, jog dials, cursor keys, touch screen navigation controls. The user can move the cursor to the "from" field. Preferably, either a menu selection appears automatically or alternatively the user invokes a menu selection by input via the navigation or selection means. In a preferred embodiment, a menu item such as 'Call Address' is offered as an action among the one or more menu selection action items. An illustrative menu selection is shown in FIG. 2*b*. As shown, the menu selection 451 graphical user interface (GUI) may include one or more of the following action items: hide menu 452, copy 454, mark unopened 456, file message 458, save message 460, reply 462, forward 464, forward to person z, reply to all 466, delete 468, more 470, email person y 472, SMS person y 474, call person y 476, view contact info 478, show qualified address 480, previous item 482, next item 484, next unopened item 486, close 488.

In the case where the user selects "call person y" 476*a* menu process is invoked. This process can perform several functions. In one case, the data handling component searches a local PIM data store 165' accessible by the software or firmware to determine if there is a contact entry associated with the selected sender's e-mail address or qualified name associated with the e-mail address. The search criterion of the search of the PIM data store may be based on the sender's email address in the e-mail message 440. If more than one phone number is located, the data handling component preferably prompts the user to select which phone number of the plurality is desired for the outbound voice call (as shown in 450). Alternatively, if no entry associated with the address is found, the user can be prompted to input a phone number for this contact (not shown). Once the phone number is selected the data handling component of mobile device 100 transmits a request to the cellular phone component to initiate an outbound voice call from the device 100 to the selected phone number. The necessary components of the cellular phone component of the mobile device then initiates (as shown in 451) and establishes an outbound voice call with the information at least partially collected from the data store 164'.

Figure 2C:
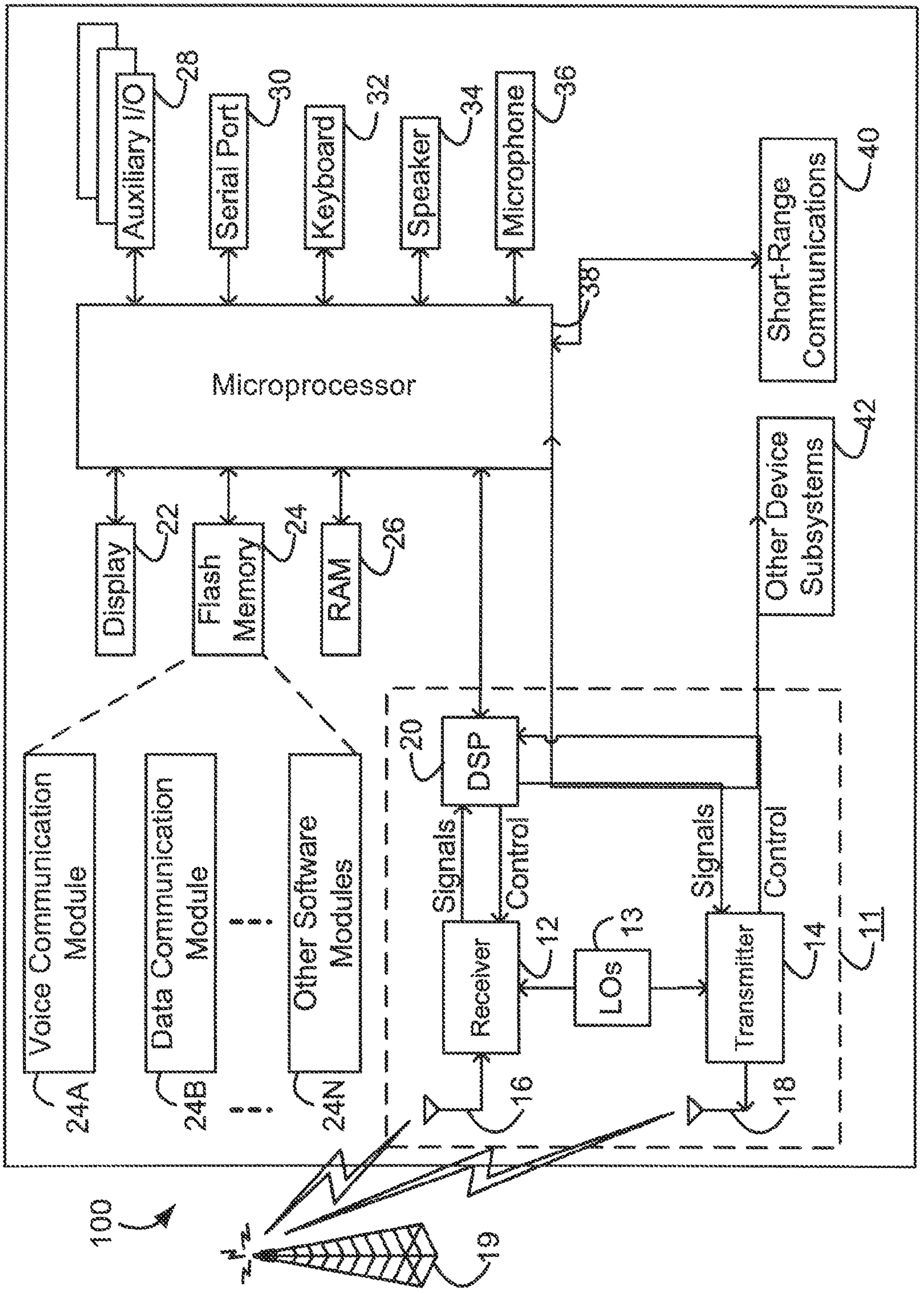
FIG. 2*c* is a block diagram of a mobile device.
Figure 3:
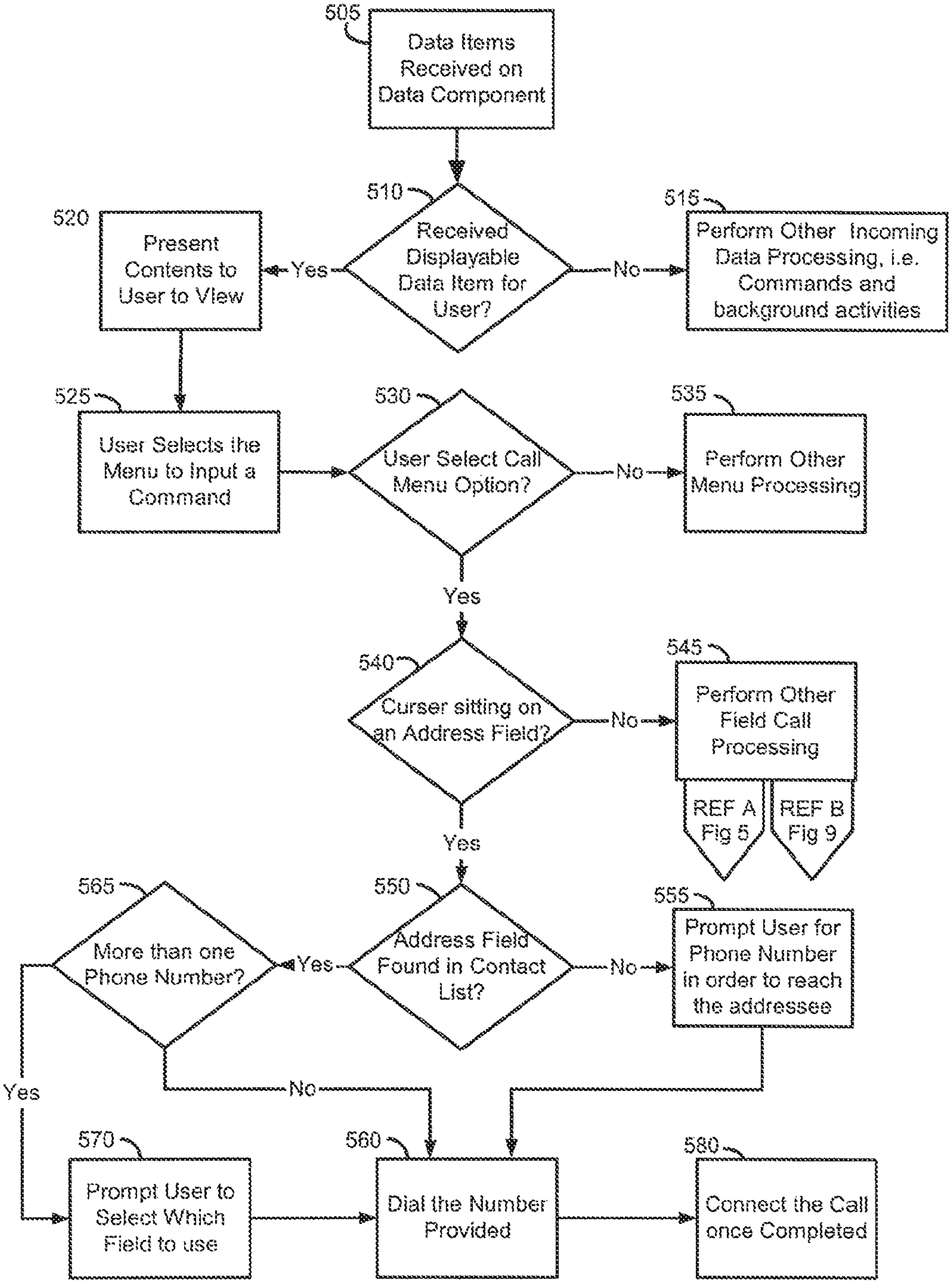
FIG. 3 is a flow chart illustrating a system and method of placing an outgoing phone call to a number associated with a field in an e-mail message.

FIG. 3 is a flow chart that illustrates an illustrative embodiment of the method associated with FIG. 2. This flow chart provides details to implement a method of making a cell phone call from an incoming data item. The first step is that mobile device 100 receives a data item 505 on the data component of the device. The data item 505 is checked to verify it is a viewable data item 510. This data message could be a command and control message, or it could be a continuation of an existing message. If the data message is a command message, a control message or some other continuation of existing data 515, it might not support a traditional sending address or other data fields. If the contents of the data item are displayable they are presented to the user for viewing 520.

During the viewing process the user can select a menu item to input a command 525. In a preferred embodiment, one or more the commands set forth in FIG. 2*a* are available to the user including the command 'Call Person Y'. In this example, at step 530 the user can either select Call or another menu command item. If the user selects another command it is processed 535. If the user selects 'Call' 530 then mobile device 100 proceeds to check to see if the user has highlighted the address field of the message 540. This field could be any address field in the data item, in FIG. 2 the example is the 'From' field but other fields would work just as well. The 'To Field', 'Carbon Copy (CC) field, or the 'From Field', could all be used. For one skilled in the art it is clear that a message, like one produced in e-mail, could have many TO and many CC fields/e-mail addresses listed within it. Additionally, if the message contains a third party's contact information, highlighting the information can allow a call to be made to the third party.

If the field the user has highlighted is not an address field other processing will be performed 545. This step cross-references to tab 'REF A', which contain other aspects of the invention. If the field is the address field it is checked against a contact list in the PIM data to see if an associated reference exists 550. For one skilled in the art it is clear that this address matching may have already been performed so that a 'friendly name' can be displayed to the user. Regardless of when the search was performed, the address is either associated with a contact entry or it is not. If there is no contact entry associated with the highlighted field the user is prompted to enter a number for the named user 555. This number is then provided to the voice-centric component to dial the number 560. If the address field does match a contact entry then a check 565 is performed to see how many numbers exist for this contact entry. If there is more than one phone number in the contact database the user is prompted to select one 570, which is given to the dialer to call 560. If there is only one number the number for the contact entry it is given to the dialer to call 560. Once the call is established the user is connected to the addressee, and can still read message 580.

FIG. 2*c* is a block diagram of a mobile device 100 that may be used by the invention herein. The device 100 includes a transceiver 11, a microprocessor 38, a display 22, Flash memory 24, RAM memory 26, auxiliary input/output (I/O) devices 28, a serial port 30, a keyboard 32, a speaker 34, a microphone 36, a short-range wireless communications sub-system 40, and may also include other device sub-systems 42. The transceiver 11 preferably includes transmit and receive antennas 16, 18, a receiver 12, a transmitter 14, one or more local oscillators 13, and a digital signal processor 20. Within the Flash memory 24, the device 100 preferably includes a plurality of software modules 24A-24N that can be executed by the microprocessor 38 (and/or the DSP 20), including a voice communication module 24A, a data communication module 24B, and a plurality of other operational modules 24N for carrying out a plurality of other functions.

The mobile communication device 100 is preferably a two-way communication device having voice and data communication capabilities. Thus, for example, the device may communicate over a voice network, such as any of the analog or digital cellular networks, and may also communicate over a data network. The voice and data networks are depicted in FIG. 1 by the communication tower 19. These voice and data networks may be separate communication networks using separate infrastructure, such as base stations, network controllers, etc., or they may be integrated into a single wireless network.

The communication subsystem 11 is used to communicate with the voice and data network 19, and includes the receiver 12, the transmitter 14, the one or more local oscillators 13 and may also include the DSP 20. The DSP 20 is used to send and receive signals to and from the transmitter 14 and receiver 12, and is also utilized to receive control information from the transmitter 14 and to provide control information to the receiver 12. If the voice and data communications occur at a single frequency, or closely-spaced set of frequencies, then a single local oscillator 13 may be used in conjunction with the transmitter 14 and receiver 12. Alternatively, if different frequencies are utilized for voice communications versus data communications, then a plurality of local oscillators 13 can be used to generate a plurality of frequencies corresponding to the voice and data networks 19. Although two antennas 16, 18 are depicted in FIG. 1, the mobile device 100 could be used with a single antenna structure. Information, which includes both voice and data information, is communicated to and from the communication module 11 via a link between the DSP 20 and the microprocessor 38. The detailed design of the communication subsystem 11, such as frequency band, component selection, power level, etc., will be dependent upon the communication network 19 in which the device is intended to operate. For example, a device 100 intended to operate in a North American market may include a communication subsystem 11 designed to operate with the Mobitex™ or DataTAC™ mobile data communication networks and also designed to operated with any of a variety of voice communication networks, such as AMPS, TDMA, CDMA, PCS, etc., whereas a device 100 intended for use in Europe may be configured to operate with the General Packet Radio Service (GPRS) data communication network and the GSM voice communication network. Other types of data and voice networks, both separate and integrated, may also be utilized with the mobile device 100.

Depending upon the type of network 19 (or networks), the access requirements for the mobile device 100 may also vary. For example, in the Mobitex™ and DataTAC™ data networks, mobile devices are registered on the network using a unique identification number associated with each device. In GPRS data networks, however, network access is associated with a subscriber or user of a device 100. A GPRS device typically requires a subscriber identity module ("SIM"), which is required in order to operate the device 100 on a GPRS network. Local or non-network communication functions (if any) may be operable, without the SIM device, but the device 100 will be unable to carry out any functions involving communications over the data network 19, other than any legally required operations, such as 911 emergency calling.

After any required network registration or activation procedures have been completed, the dual-mode device 100 may the send and receive communication signals, including both voice and data signals, over the network 19 (or networks). Signals received by the antenna 16 from the communication network 19 are routed to the receiver 12, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 20. In a similar manner, signals to be transmitted to the network 19 are processed, including modulation and encoding, for example, by the DSP 20 and are then provided to the transmitter 14 for digital to analog conversion, frequency up conversion, filtering, amplification and transmission to the communication network 19 (or networks) via the antenna 18. Although a single transceiver 11 is shown in FIG. 1 for both voice and data communications, it is possible that the device 100 may include two distinct transceivers, a first transceiver for transmitting and receiving voice signals, and a second transceiver for transmitting and receiving data signals.

In addition to processing the communication signals, the DSP 20 also provides for receiver and transmitter control. For example, the gain levels applied to communication signals in the receiver 12 and transmitter 14 may be adaptively controlled through automatic gain control algorithms implemented in the DSP 20. Other transceiver control algorithms could also be implemented in the DSP 20 in order to provide more sophisticated control of the transceiver 11.

The microprocessor 38 preferably manages and controls the overall operation of the dual-mode mobile device 100. Many types of microprocessors or microcontrollers could be used here, or, alternatively, a single DSP 20 could be used to carry out the functions of the microprocessor 38. Low-level communication functions, including at least data and voice communications, are performed through the DSP 20 in the transceiver 11. Other, high-level communication applications, such as a voice communication application 24A, and a data communication application 24B may be stored in the Flash memory 24 for execution by the microprocessor 38. For example, the voice communication module 24A may provide a high-level user interface operable to transmit and receive voice calls between the dual-mode mobile device 100 and a plurality of other voice devices via the network 19. Similarly, the data communication module 24B may provide a high-level user interface operable for sending and receiving data, such as e-mail messages, files, organizer information, short text messages, etc., between the dual-mode mobile device 100 and a plurality of other data devices via the network 19. The microprocessor 38 also interacts with other device subsystems, such as the display 22, Flash memory 24, random access memory (RAM) 26, auxiliary input/output (I/O) subsystems 28, serial port 30, keyboard 32, speaker 34, microphone 36, a short-range communications subsystem 40 and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 may be used for both communication-related functions, such as entering a text message for transmission over a data communication network, and device-resident functions such as a calculator or task list or other PDA type functions.

Operating system software used by the microprocessor 38 is preferably stored in a persistent store such as Flash memory 24. In addition to the operation system, which controls all of the low-level functions of the device 100, the Flash memory 24 may include a plurality of high-level software application programs, or modules, such as a voice communication module 24A, a data communication module 24B, an organizer module (not shown), or any other type of software module 24N. The Flash memory 24 also may include a file system for storing data. These modules are executed by the microprocessor 38 and provide a high-level interface between a user of the device and the device. This interface typically includes a graphical component provided through the display 22, and an input/output component provided through the auxiliary I/O 28, keyboard 32, speaker 34, and microphone 36. The operating system, specific device applications or modules, or parts thereof, may be temporarily loaded into a volatile store, such as RAM 26 for faster operation. Moreover, received communication signals may also be temporarily stored to RAM 26, before permanently writing them to a file system located in the persistent store 24.

An exemplary application module 24N that may be loaded onto the dual-mode device 100 is a personal information manager (PIM) application providing PDA functionality, such as calendar events, appointments, and task items. This module 24N may also interact with the voice communication module 24A for managing phone calls, voice mails, etc., and may also interact with the data communication module for managing e-mail communications and other data transmissions. Alternatively, all of the functionality of the voice communication module 24A and the data communication module 24B may be integrated into the PIM module.

The Flash memory 24 preferably provides a file system to facilitate storage of PIM data items on the device. The PIM application preferably includes the ability to send and receive data items, either by itself, or in conjunction with the voice and data communication modules 24A, 24B, via the wireless network 19. The PIM data items are preferably seamlessly integrated, synchronized and updated, via the wireless network 19, with a corresponding set of data items stored or associated with a host computer system, thereby creating a mirrored system for data items associated with a particular user.

The mobile device 100 may also be manually synchronized with a host system by placing the device 100 in an interface cradle, which couples the serial port 30 of the mobile device 100 to the serial port of the host system. The serial port 30 may also be used to enable a user to set preferences through an external device or software application, or to download other application modules 24N for installation. This wired download path may be used to load an encryption key onto the device, which is a more secure method than exchanging encryption information via the wireless network 19.

Additional application modules 24N may be loaded onto the dual-mode device 100 through the network 19, through an auxiliary I/O subsystem 28, through the serial port 30, through the short-range communications subsystem 40, or through any other suitable subsystem 42, and installed by a user in the Flash memory 24 or RAM 26. Such flexibility in application installation increases the functionality of the device 100 and may provide enhanced on-device functions, communication-related functions, or both. For example, secure communication applications may enable electronic commerce functions and other such financial transactions to be performed using the device 100.

When the dual-mode device 100 is operating in a data communication mode, a received signal, such as a text message or a web page download, will be processed by the transceiver 11 and provided to the microprocessor 38, which will preferably further process the received signal for output to the display 22, or, alternatively, to an auxiliary I/O device 28. A user of dual-mode device 100 may also compose data items, such as email messages, using the keyboard 32, which is preferably a complete alphanumeric keyboard laid out in the QWERTY style, although other styles of complete alphanumeric keyboards such as the known DVORAK style may also be used. User input to the device 100 is further enhanced with a plurality of auxiliary I/O devices 28, which may include a thumbwheel input device, a touchpad, a variety of switches, a rocker input switch, etc. The composed data items input by the user may then be transmitted over the communication network 19 via the transceiver 11.

When the dual-mode device 100 is operating in a voice communication mode, the overall operation of the device 100 is substantially similar to the data mode, except that received signals are preferably be output to the speaker 34 and voice signals for transmission are generated by a microphone 36. Alternative voice or audio I/O subsystems, such as a voice message recording subsystem, may also be implemented on the device 100. Although voice or audio signal output is preferably accomplished primarily through the speaker 34, the display 22 may also be used to provide an indication of the identity of a calling party, the duration of a voice call, or other voice call related information. For example, the microprocessor 38, in conjunction with the voice communication module and the operating system software, may detect the caller identification information of an incoming voice call and display it on the display 22.

A short-range communications subsystem 40 may also be included in the dual-mode device 100. For example, the subsystem 40 may include an infrared device and associated circuits and components, or a Bluetooth™ short-range wireless communication module to provide for communication with similarly-enabled systems and devices.

Figure 4:
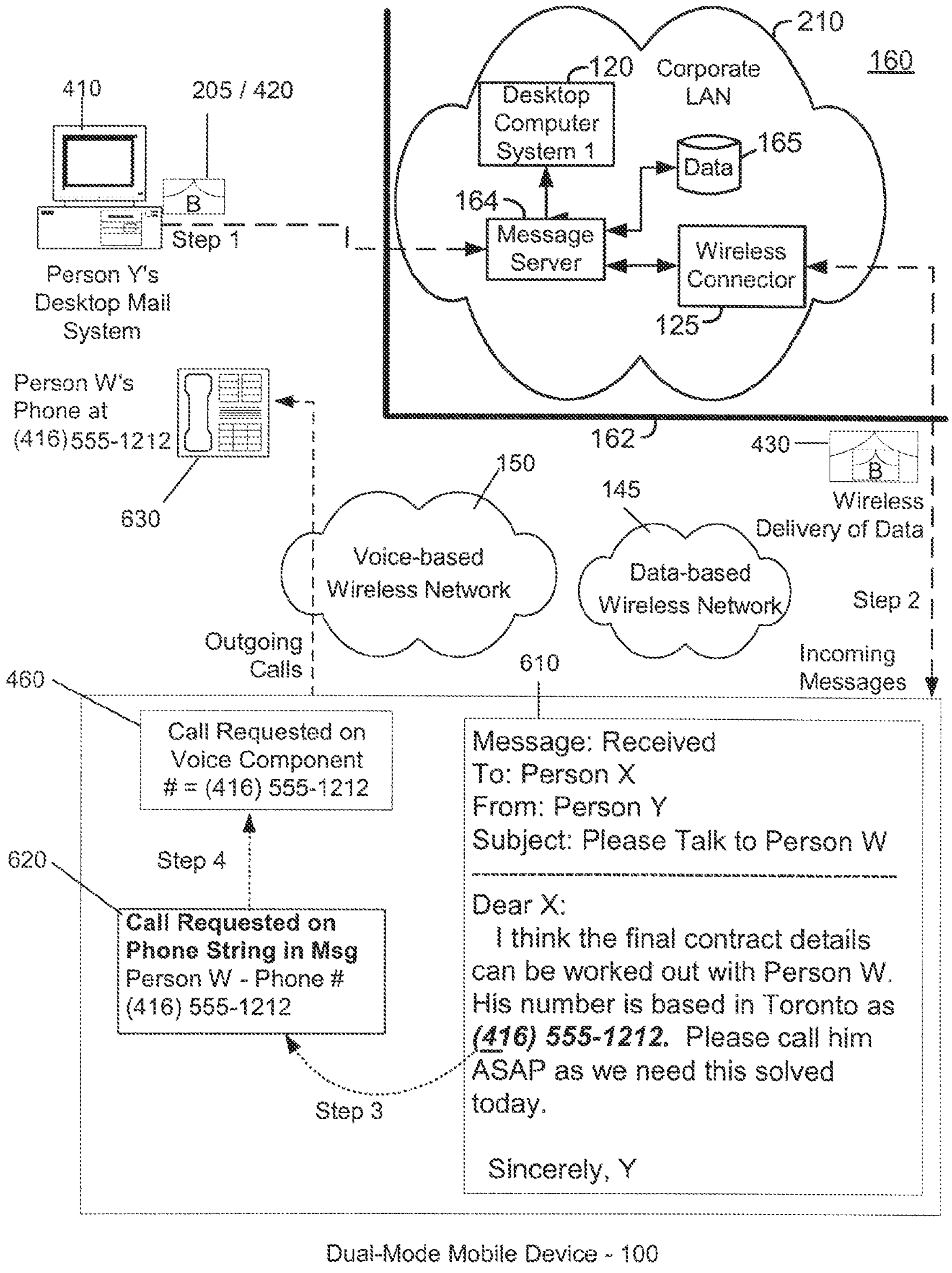
FIG. 4 is an illustration of a system and method of placing an outgoing phone call to a number in the body of an email message.

Turning now to FIG. 4 this illustration is another embodiment of handling incoming data to perform outgoing phone calls, as was FIG. 2. This illustration depicts the ability for the invention to scan normal data fields and identify embedded phone numbers. Linking a non-address field arriving on an incoming data item, to an outgoing voice event is a feature of this aspect of this invention. A phone number scanning process allows a data message to trigger special logic on the mobile device 100 that enables the user to automatically call back any number that might appear within the text of the data message 440.

Although not shown in FIG. 4, the various components of the mobile device as discussed with respect to FIG. 16, would equally apply here including local data store 165' (shown in FIG. 2). In FIG. 4, the first step shown is a message 420 with contents 'B' leaving Person Y's desktop computer system 410 destined to reach the desktop of the user that owns the mobile device 100. The data items is analogous to message 205 from FIG. 2 as it is considered just another data item as it arrives at wireless connector 125. Within the company's firewalled environment 160, the message is compressed, encrypted and re-enveloped 430 and then is sent, via the wireless network 145, to the mobile device 100. Step 2 is the delivery of message 'B' through the data-based wireless network 145 to the mobile device 100.

Once the message is received the user is notified and opens the message to start reading what was sent 610. In this case the data viewer could be an e-mail viewer, a calendar view, a todo list view, a task view, an expense report viewer, a database viewer, an Internet browser, a Wireless Access Protocol (WAP) browser, or any proprietary data viewer that might be receiving data items from a host system. Naturally the viewer selected would match the data item, like an e-mail message, a calendar message, a todo item, a memo-pad message, expense report data, a database record, an HTTP, XML, WML or HDML markup page.

During the viewing process the user can move the cursor through the data item and highlight a phone number. In FIG. 4 the example used is an e-mail message with a phone number reference to a third-party colleague, Person W. Person W is not in the contact list, but by selecting the phone number by rolling over it, highlighting it, or otherwise indicating it in a manner that would be known to one of skill in the art, the user can select the 'Call Number' menu option to perform a dynamic call to the selected number, shown as step 3.

Once the user selects a string to call on, the software or firmware on the mobile device 100 proceeds to verify the string as a real phone number 620. Once the string is verified mobile device 100, step 4 is to submit the phone number string to the voice component for dialing. This is the same voice component as used in the example of FIG. 2. In an advanced embodiment of the invention the phone string scanner can look forward and backward from the cursor to find a valid phone number if one is not selected.

Figure 5:
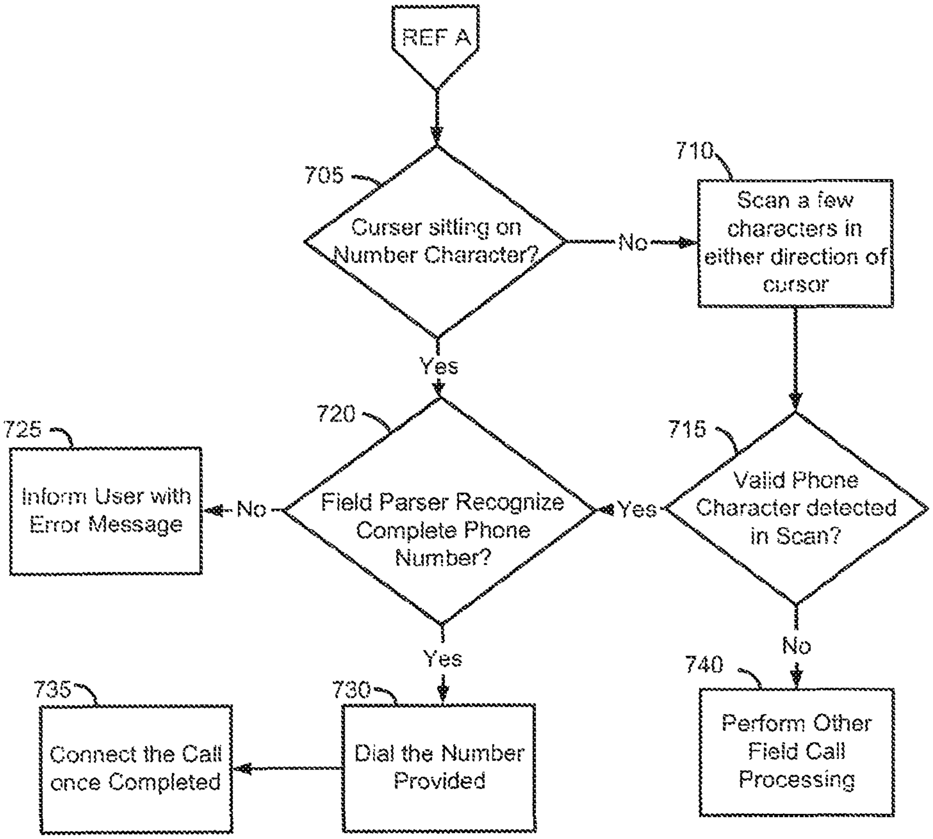
FIG. 5 is a flow chart illustrating a method of initiating an outgoing phone call to a number associated with a field in a data item.

Turning now to FIG. 5 this illustrates a flow chart of how mobile device 100 scans for phone numbers in data items arriving on the data component of the mobile device 100. This flow chart is cross-referenced to FIG. 3 with a tag labeled REF A. Reference A occurs as the user selects a menu item to 'Call Number' and has not highlighted or selected an address field, or the address field is not numeric.

Step 1 of FIG. 5 is a test to see if the cursor is currently sitting on a phone number character 705. A phone number character would also include brackets '(' and ')' and a dash character. These characters are allowed for syntax and readability reasons and they are commonly used in the art. If the current character not a valid phone number character then the software will scan in either direction looking for a valid phone character 710. Then if a valid phone character is found in the scan 715 the invention proceeds to parse and check for a full phone number 720. If no valid phone character is found at 715, then the invention might proceed to other forms of call processing such as mapping a mixed string of number and letters to a phone number based on the letters typically assigned to the keys of telephone (e.g. 'HAM' would be mapped to '416').

Similarly from 705 if the current character pointed to by the cursor is already a phone number character the invention proceeds directly to the field parser to look for a whole phone number 720. If a full phone number cannot be verified the user is informed with an error message 725. If a phone number is detected then the number is given to the voice component 730 to dial the number found. Once the call is initiated the user is connected to the caller 735.

In this next section we explore three ways of providing similar advanced data and voice integration. These three examples in FIGS. 6, 7 and 8 show how an incoming message can be used to generate a conference call on the voice component of the mobile device.

Figure 6:
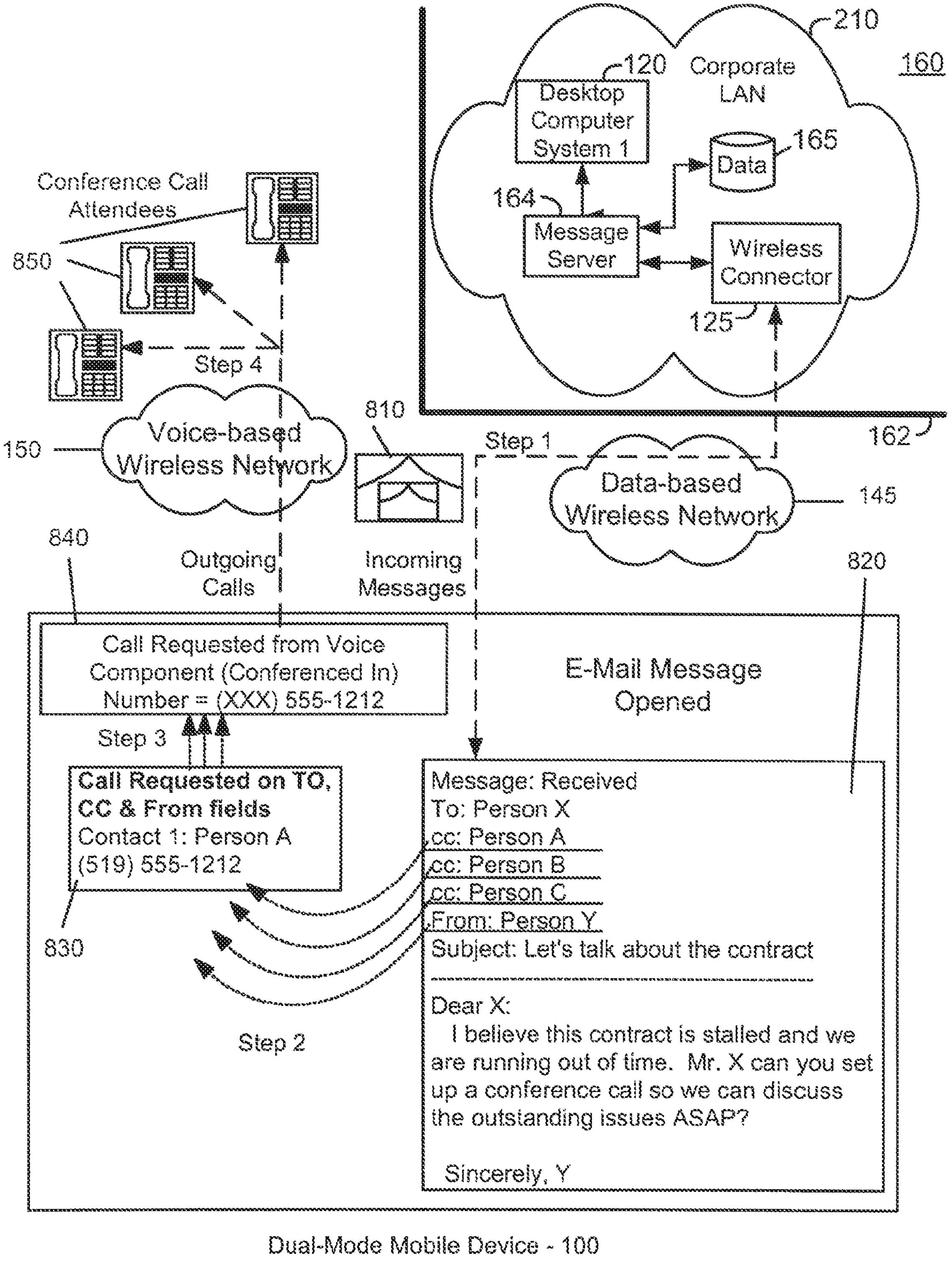
FIG. 6 is an illustration of a method of initiating a conference call to numbers associated with fields in a data item.

Turning now to FIG. 6, in this solution the first step is the arrival of a data item 810 from wireless connector 125. In a presently preferred embodiment the data item is an e-mail message that has been compressed and encrypted before leaving the company firewall towards the data component of the mobile device 100. It is possible that the data item is also a work flow item, a web page, or even a proprietary database item. Once it arrives it is opened by the user and displayed in a data view that matches the type of information received 820. In this example the e-mail message is shown and lists just one 'To' field, three 'CC' fields and one 'From' field. For one skilled in the art it is clear that a phone number to be conferenced could also come from the body of the message using the scanning technique shown in FIG. 4.

At any time during the viewing process the user can roll to an address field and select a menu 'Conference Address'. This method is similar to the approach taken in FIG. 3 and show through the flow chart in FIG. 3. Step 2 takes place once the user does decide to start a conference call and selects an address to call. Once the addressee is selected, verification is performed 830 to ensure there is a number for the addressee; either in the contact list or hand entered by the user. These steps are also described in greater detail in FIG. 2 and the data flow FIG. 3. Once the phone number is verified the invention passes the phone number to be conferenced to the cell phone component for dialing 840. This step is the same for all the numbers provided to the cell phone, no matter where they were located. Once the call is completed the user and the called party have a private conversation until the user selects the menu again. At this menu the user mobile device user can either join the conference, or proceed to add more conference attendees. This is described in detail in the data flow diagram illustrated in FIG. 9.

Figure 7:
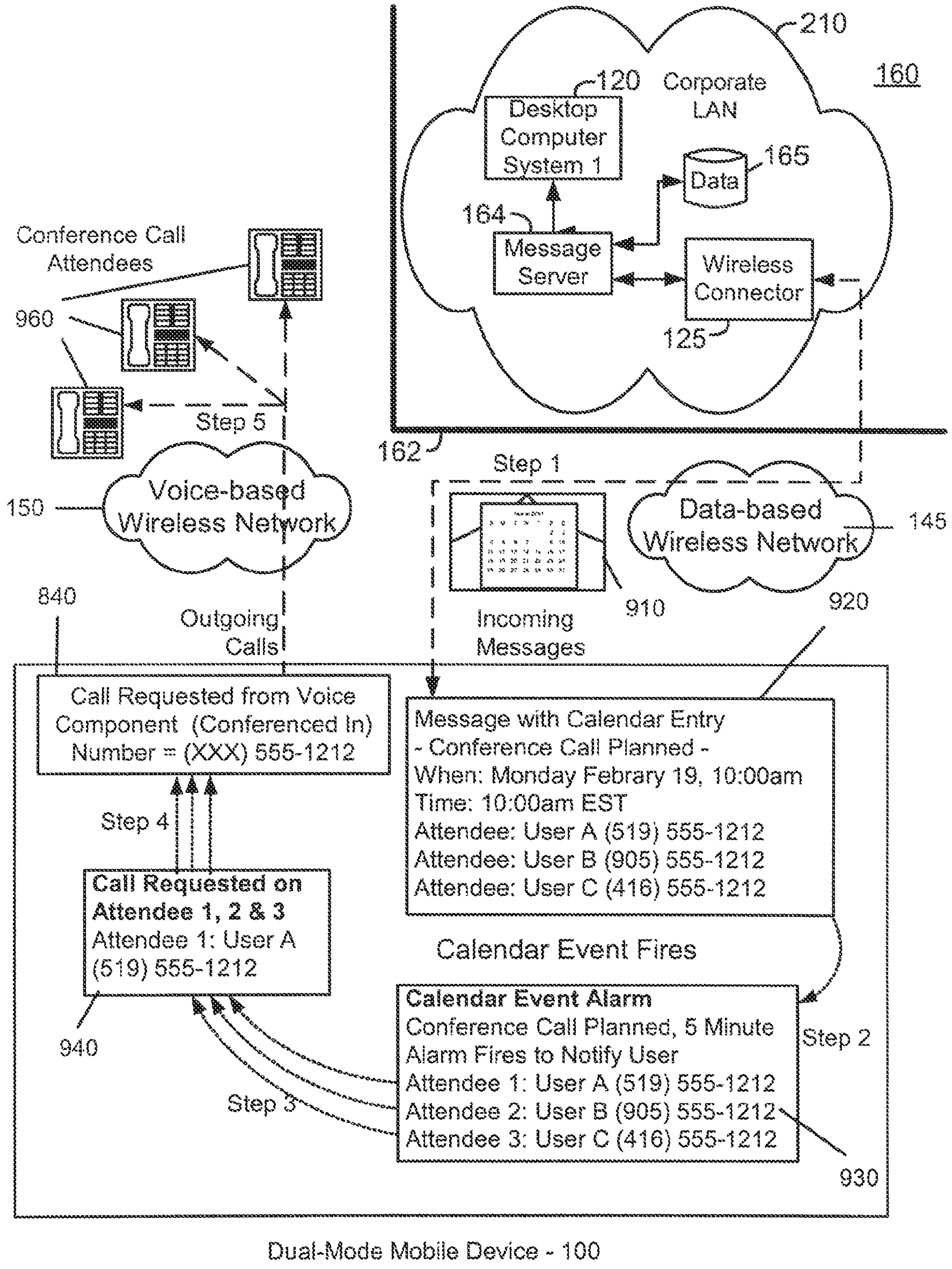
FIG. 7 is an illustration of a method of initiating a conference call to numbers stored in a calendar appointment.
Figure 8:
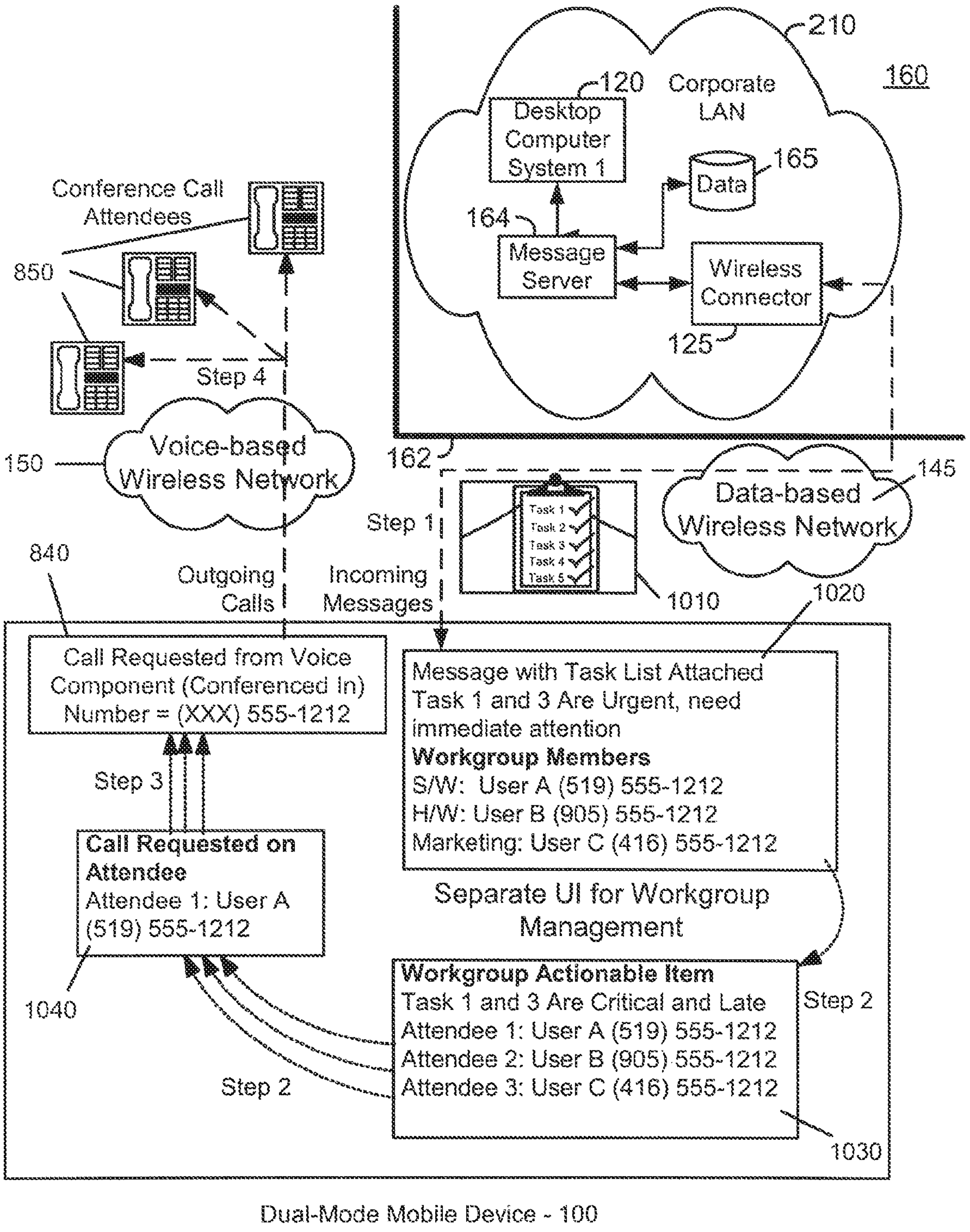
FIG. 8 is an illustration of a method of initiating a conference call to numbers stored in a todo list task.

Turning now to FIG. 7 we see another embodiment of the same conference call ability shown with FIG. 6. In this solution the first step is the arrival of a data message that in this example carries a new calendar event. In the case where this calendar event is a proposed meeting or appointment request and the request is 'accepted' by the user at the mobile device 100, the PIM software functionality of the device preferably sometime later will alert the user to the meeting start time. In one embodiment, this meeting request is that it will also contain the phone numbers of the other participants on the call that can be used to establish the calls when the meeting approaches. The phone numbers of attendees may be added to the meeting request data message prior to transmission from the host system to the mobile device. Alternatively, the phone numbers of the attendees may be added at the mobile device based on data derived from the local PIM data store. This short-cut and many others are very easy to achieve in a true mobile device, this is built from the ground up to handle normal data events and PIM information that a desktop system could be processing.

Step 1 of FIG. 7 illustrates a new data item 910 leaving the user's desktop system, via the wireless connector program 125. Before this calendar event 910 leaves the secure company firewall 162, it is compressed, encrypted and re-enveloped for delivery to the mobile device 100. The packaged calendar event traverses the Internet and then is communicated through the data-based wireless network to the mobile device 100 via its RF link. Once received the message is opened, unencrypted, uncompressed and presented to the user via the calendar UI 920. The UI can be done in many ways, but in this simple example the meeting time, location (if relevant), and attendee list is provided. With the attendees is the phone number for each attendee, which can be used later by the invention.

Sometime after the user has accepted to new calendar event the calendar alarm fires as part of step 2 in this example. As one skill in the art of UI design and PIM/User interaction can appreciate the calendar on the device will attempt to notify the user when the event approaches. There are several ways to notify the user before the event is reached including but not limited to: running a vibrator, blinking a light, sounding an alarm, popping up a notification box on the screen or some combination of the above. The user can select the amount of time before the event takes place before starting the alarm, the user can also select the alarm method, i.e. vibration, beeping or a combination of the two. In step 2 the alarm box appears for the user 930 to inform them the meeting is approaching. In this example the user of the mobile device 100 is in charge of the meeting and a conference call is planned 930. This invention would work just as well if only one other person were involved in this meeting, but the fact there are three people makes the invention even more useful.

Step 3 takes place with the alarm screen in front of the user, they are able to select each of the attendee's names and request a 'Conference Call' be made to that person. The selection might involve using a stylist on a touch screen, scrolling to the name and pressing a key, or selecting a menu item. Step 3 verifies the name provided, perhaps by pulling the phone number out of the contact database, and requests the cell phone voice component of the mobile device 100 to make the call 840. This is the same request made in FIG. 6 there is no difference. The call is then made to a person's phone 850, assuming they answer the call, and once the circuit is completed the user can talk to the attendee and conference them into the other calls parked on the device. Once the call is complete the user can at any time select a menu and go retrieve another call or join the conference. It is well known to anyone skilled in the art of telephony how conference calls are achieved and established so this step is not described further, see FIG. 9 for more details. As each attendee is called they are progressively placed into the conference call hosted by the user of the mobile device 100. As one call completes, or fails, the user is returned to the original UI screen for the alarm event 930 where they can scroll to the next attendee and request a call be made to him or her. Once all attendees have been tried and conferenced in, naturally some attendees may not be reachable, the conference can start and the user can join in with the last attendee. The ability for the user to scroll and perform minimal keystrokes to start the conference call makes the mobile device 100 an invaluable tool for completing such a complex task with such a small form-factor type of device.

Turning now to FIG. 8 there is another illustration of advanced method to perform a conference call from an incoming data item. Step 1 in this example occurs when a data item 1010 is prepared and leaves the user's desktop or company environment. This data item 1010 may have been prepared manually by a secretary, or generated automatically by some workgroup management software running in the corporate environment 160. As it arrives to the mobile device 100 via the data-based wireless network 145 the user opens the item for viewing 1020. Once opened for viewing the user realizes it is a task list containing personal task information. In this example the tasks are part of a project that involves many members working together in a project team or workgroup 1020. For anyone skilled in the art of workgroup software it is clear that there are many available products that perform advanced workgroup management within a LAN environment. Some of the newer products can even do full workgroup management through the Internet.

Step 2 of FIG. 8 takes place when the user decides that something needs to be done about a given task item 1030. Within the workgroup management UI the user selects the 'Start Conference' menu item and begins to call people. Just as in FIG. 7 each user is selected by rolling the cursor to the user's name or number and selecting the Conference Attendee menu item. This can also be easily achieved using touch screen methods by touching the user's name or number to begin the conference call. As always the software verifies the number, or allows the user to select a number from the contact database 1040. Once this is complete it is passed to the cell phone component 840 to start the call. Once the attendee is reached the user has a brief conversation with the attendee and then joins them into the conference. This method proceeds until all necessary attendees are joined into the call and the user finally joins the conference. Note that it is not essential that every single person on the workgroup actionable item to join the call, only the attendees the user deems necessary.

Figure 9:
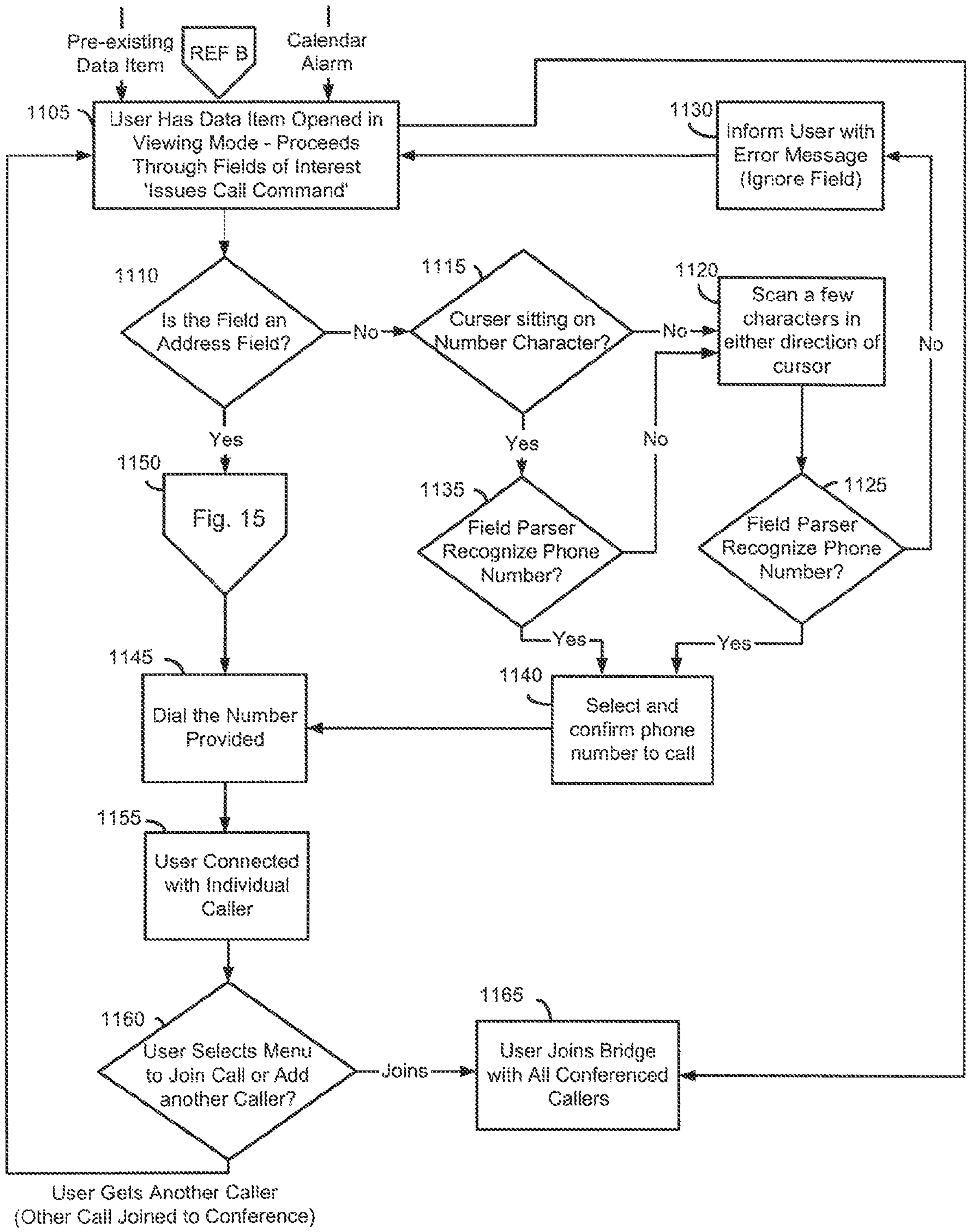
FIG. 9 is a flow chart illustrating a method of initiating a conference call by iterating through a plurality of phone numbers associated with the contents of fields in a data item.

Turning now to FIG. 9 this diagram provides a flow chart that describes the steps to create a conference call from a data item within a mobile device. As with FIG. 5, FIG. 9 also references back to the flow chart in FIG. 3. From FIG. 3 we have the reception of data items 505 that are verified to be viewable by the user 510. Once the user has opened them and viewed them 520 they select the menu 525 to input a command like 'Call' 530. If the cursor is not sitting on an address field 540 then more advanced processing is required 545 and we reach REF B that takes the user to FIG. 9.

Figure 10:
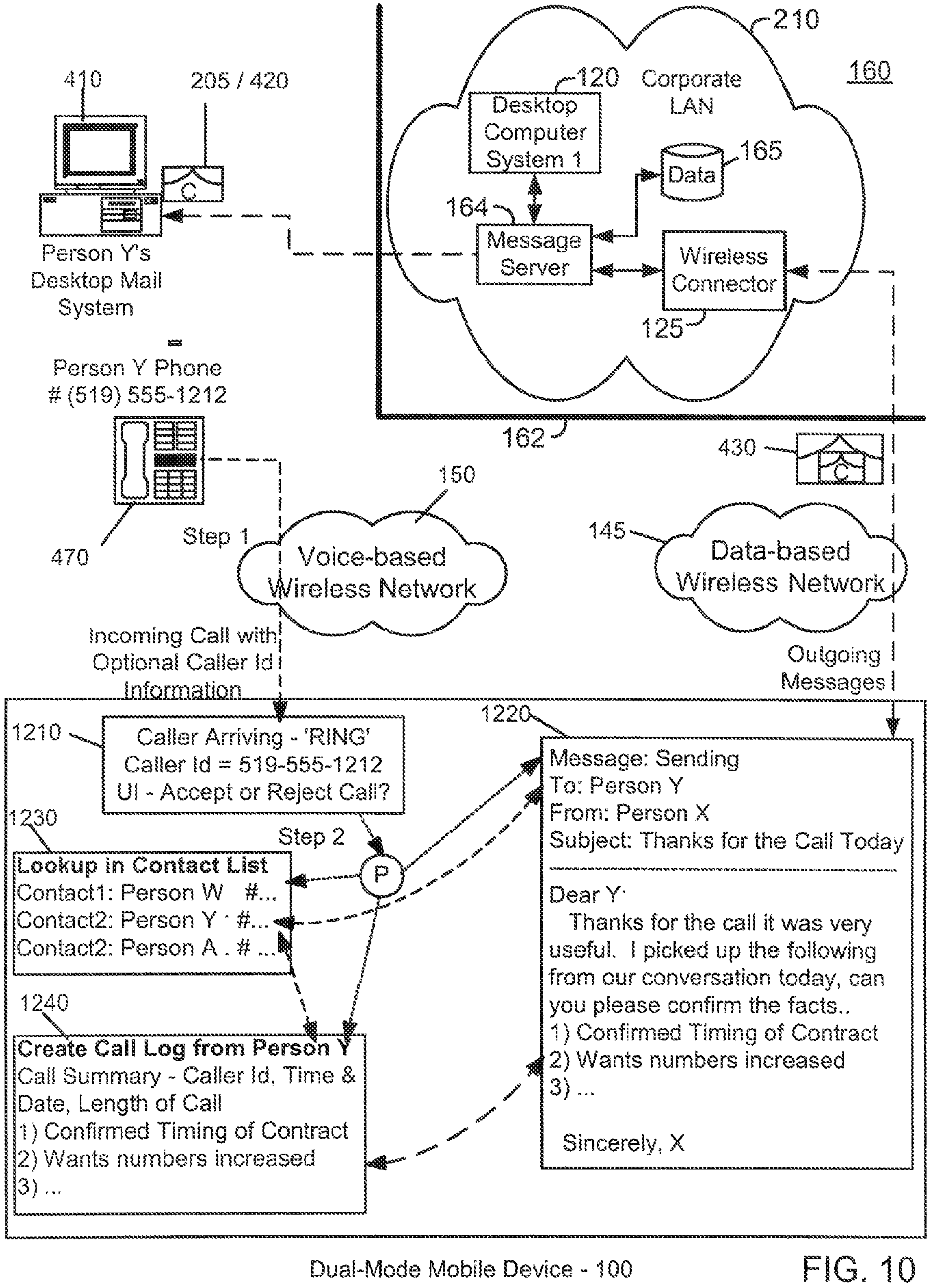
FIG. 10 illustrates a method of managing incoming phone calls using information provided to the data component of the mobile device by the voice component.

In FIG. 9 we have several ways to reach step 1 at 1105. Coming from FIG. 3 the user is viewing a normal data item (REF B), the user might be viewing a calendar alarm, or they may have opened a pre-existing data item, like a task list. With this data item open the user is normally scanning the information and consider what they want to do. In the case of FIGS. 8, 9 and 10 the user is considering starting a conference call and have invoked the menu and issued a command like 'Call' or 'Start Conference' and is about to select one or more conference call attendees.

At this point the software in the mobile device 100 must determine exactly what the user wishes to do. The system is flexible enough that they might take several names from the address field of the data item, combine that with phone numbers in the body of the message, or pull them from a calendar alarm. Wherever the phone numbers come from the user simply iterates through the data available adding attendees to the conference. Proceeding from step 1105 the software determines where the cursor is currently sitting and what does the user want to do. At step 1110 the software determines if the cursor is on an address field. The address field might simply be defined by the syntax, or it could be defined by an existing reference to an entry in the contact database. If it is not sitting on an address field the software checks to see if the cursor is pointing to a valid phone number character 1115. As mentioned before this could be a number from 0 to 9, a bracket '(' or ')' or it could be a dash '-'. If the cursor is not directly over a valid phone number character then it will scan a few characters in either direction from the cursor looking for a valid phone character 1120. If a valid phone character is found at this stage the field parser checks for a complete phone number 1125. If a phone number is found it is presented to the user for confirmation before the call takes place 1140. If no phone number is found an error is displayed 1130, the field is ignored and the user is returned to the message to scan further for other attendees to add to the conference call 1105.

Returning to step 1115 if the cursor is sitting on a valid phone number character then an attempt is made to confirm that a full phone number is present 1135. If the valid phone number character does not represent a phone number then the software will scan a few characters in either direction looking for another valid phone number character 1120. If another character is found a further test is preformed 1125 looking for a phone number. If there is no phone number the field is ignored and an error message is displayed 1130. Otherwise the number is confirmed to the user 1140 and will be even eventually used to dial the cell phone component 1145.

Figure 13:
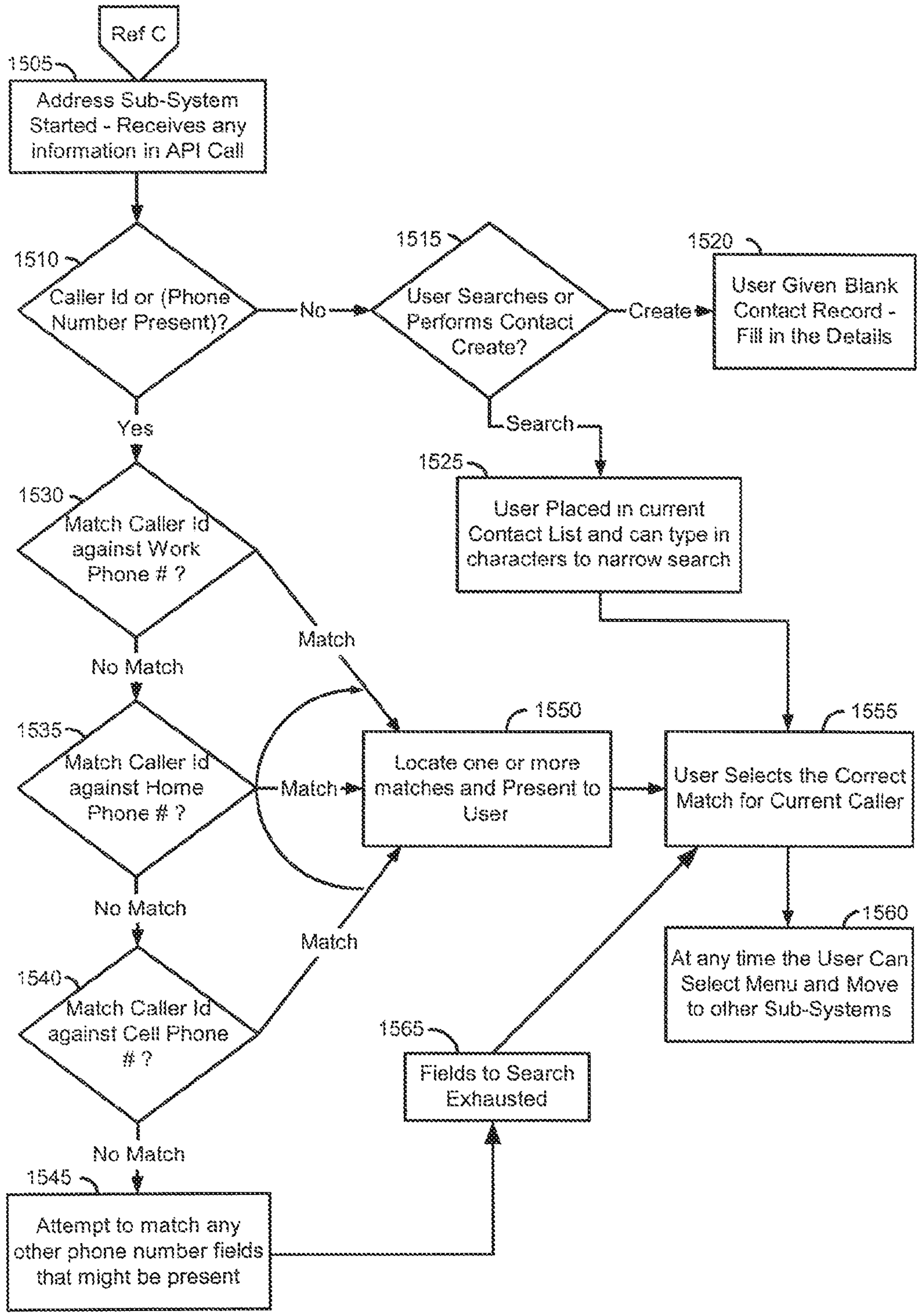
FIG. 13 is a flow chart illustrating a method of locating or creating a contact entry based on incoming caller id information.

Returning back to step 1110 if the cursor is currently pointing to an address field the process proceeds to Reference C ('REF C'). Reference C goes to FIG. 13, which performs a search of the contact database and resolves the address entry to a phone number. Once the address field is reduced to a phone number it is provided to the cell phone dialer to call the number 1145. Once the attendee is reached they have a brief conversation 1155 with the user of the mobile device 100. After greeting the user and telling them what is about to happen the user invokes a command to either join the new attendee to the conference 1160, or to joint the attendee and himself into the conference 1165. If they decide that further callers are required they proceed back to the scanning step 1105 to look for another name or number to call. If for some reason they go back to step 1105 and cannot find any other phone number or attendees they can take a short cut directly back to join the existing conference call 1165.

FIG. 10 illustrates the method of receiving a telephone call, and the subsequent actions of mobile device 100 for handling the call and providing the user with the benefits of true integration of the voice and data components. In this example a phone call arrives in from Person Y and causes one or more data related events to take place. These data events can be configurable by the user but normally follow a preferred order. This illustration also presents one possible use of the Caller Id (CID) when present. Most calls contain caller id information, though calls from overseas, and from parties wishing to block the caller id information, will arrive at mobile device 100 without caller id information. Though typically the caller id information is used to determine the actions taken by the data component of mobile device 100, there are still automatic actions that can take place if the Caller Id information is absent. As calls arrive, the user has the ability to open a contact database record, or create a new contact record based on the incoming caller id information if the number provided cannot be matched to one in the address book. This action allows the user to populate the contact information stored by the mobile device on an ongoing basis to provide the most up to date information possible. This also allows other data-centric events to be performed on the data, either upon receipt of the caller id in a subsequent call, or from a data component initiated event.

The term Caller Id (CID) is also termed Calling Number Delivery (CND) or Calling Number Identification (CNI), came about as an extension of Automatic Number Identification (ANI). The transmission of CID information takes place between the first and second ring. The information sent typically includes the date, time, and calling number. The name associated with the calling number may also be included. The CID is transmitted by a variety of interconnected wireless networks so that this information reaches the voice component of the mobile device 100.

Step 1 of FIG. 10 occurs when a voice call arrives again from an external phone caller, labeled Person Y (470), and arrives into the mobile device 100. Each call will either have Caller Id information or it will not have that information present, in both cases the user is presented with an indication that a call is arriving 1210. This indication may be a visual alert, an audio alert, or a vibrating alert. In the event that no Caller Id information is present the user has less information presented to help them make the decision about whether to accept or reject the call 1210. When Caller ID information is present the user is presented with all available information and the cell phone component will 'notify' the user of the call and present a dialogue box so they can accept or reject the call 1210.

After the call is accepted step 2 takes place, under the direction of the user's configured preference (P). In this example the preference, labeled 'P', can take the user to (A) directly to do a contact database lookup 1230 (B), to the call log 1240 or directly (C) to the e-mail compose area 1220. For one skilled in the art it is clear that the arrival of an incoming call could take the user to any number of data centric sub-systems including: the task/todo subsystem, the expense reporting subsystem, the time reporting subsystem, the calendar subsystem. One of skill in the art will readily appreciate that the preceding list is merely exemplary and is not exhaustive. In the preferred embodiment the user configures the mobile device 100 to look-up the incoming phone number in the contact database 1230, also referred to as a an address book, where each record in the contact database is referred to as an address book entry. This is very handy when the incoming Caller Id does not include alphabetic text for the incoming call, just a phone number. Once the contact entry has been located the invention will automatically take the user directly into the Call Log area so that notes on the call can be taken 1240. For a busy executive, a salesperson or a lawyer this kind of time tracking method would be indispensable to their daily workday. If the Caller Id information is not present the invention can direct the user directly into the Call Log area where the caller's name can be input manually during the duration of the call, or upon completion of the call. Since the user can receive the call with their earphone or ear-bud within their ear their hands are free for typing on the keyboard, or using a stylus on a touch screen, during the call. During this process, the user can enter caller information, e-mail address, phone numbers, addresses and business information, just as they would in a normal PIM address book application.

In the preferred embodiment the contact database search can take place in two ways, although the lookup for a contact record is not limited to just these two searches. The first search of the contact list will try to match the Caller Id's phone number against the phone numbers already in the contact database on the mobile device 100. This is the presently preferred first search because it is likely that the original phone number will be a better match to a number in the contact database. Naturally the Caller Id information will be checked against business numbers, home numbers and cellular phone numbers. In the event that the phone number does not match an existing entry, an intelligent pattern matching algorithm can be employed to match the Caller Id's Name to the Names in the Contact List. This match might start by looking to match the entire first name and last name, then just the last name, then just the first name, etc. Finally the match might try to match the first 3 digits of the first name and last digit of the last name, or some similar patterns to ensure that the right number of references is found. For one skilled in the art of pattern matching the above described method of pattern matching will be readily understood to be merely exemplary.

Figure 11:
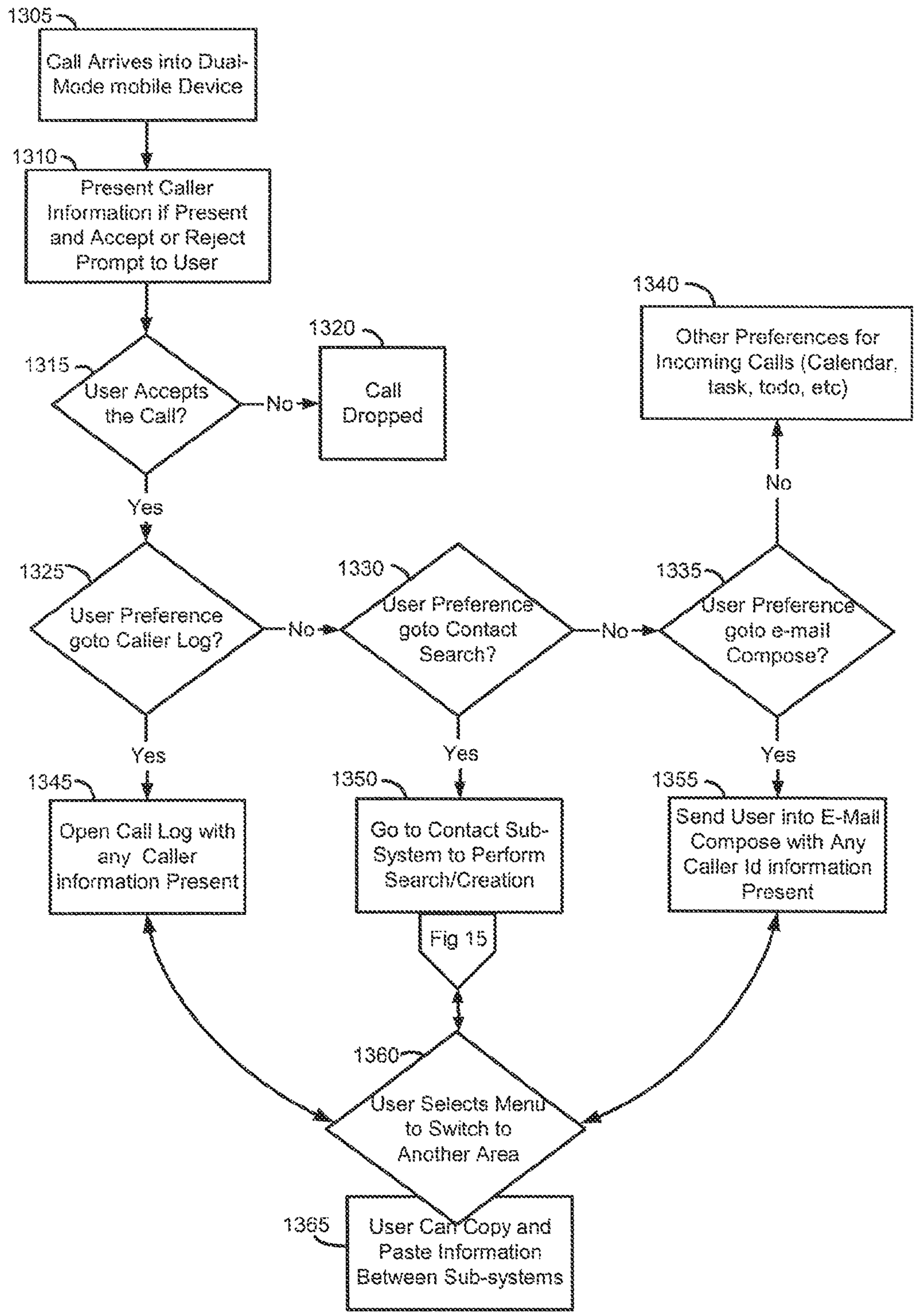
FIG. 11 is a flow chart illustrating a method of processing an incoming telephone call.

Once in the contact database search area there are several more complex patterns that could be used to find or create a contact entry. FIG. 11 illustrates some of the choices when looking for a contact entry. Once in the call log creation step 1240 or in the compose step 1220 the user can move back and forth as needed. This is shown by the dashed lines with arrows in both direction. As shown in the example the user makes a few notes about the incoming call and appends them into an e-mail message being composed to the same user, Person Y. In this example a summary of the call is then mailed to Person Y in order to confirm the main issues discussed and agreed to. The automatic creation of an email entry prevents the tedious efforts required to create an email message on a form factor limited device such as the presently preferred embodiment of mobile device 100. The user can edit the name and phone number, as well as the categorization of the phone number in a created entry, much as the user can select a new email address for a created email message, the implementation of the ability to modify the automatically created data items will be well understood by one of skill in the art.

Turning now to FIG. 11 there is flow chart that further describes how an incoming phone call can affect the data component of the mobile device 100. The first step 1305 is the arrival of an incoming phone call. If present the Caller Id information is presented to the user with a prompt to accept or reject the call 1310. If the call is rejected 1315 the call will be dropped 1320 and the user will have no further action to perform with respect to this call. Method of dropping unaccepted telephone calls are well known in the art. If the call is accepted 1315 the user proceeds to the preference of their choice 1325. If the preference is to create a Caller Log for the call 1325 they proceed to the call log sub-system 1345. If the preference is to search the contact database 1330 they will proceed to 1350 and Reference C (REF C'), which is expanded in FIG. 13. Otherwise there is a check to see if the user wants to go directly into doing an e-mail compose 1335, otherwise they could be taken to many other choices for handling this incoming call including calendar, tasks or todo subsystems 1340.

Going back to step 1325 the user might be sitting within the call log sub-system taking notes on the current call 1345. At any time they could select a menu or button to switch sub-systems. This could be done by a roller-wheel click, a specially assigned key or by a touch screen action. Once they enter the menu select area 1360 they can decide to move to the contact or e-mail sub-system and take information with them like the caller id, call duration and other information. The user also has the choice of copying and pasting 1365 information between sub-systems. This is shown in FIG. 10 when the user copied the call log notes from the current call log and pasted them into an e-mail message. Going back to step 1330 the user might have decided to enter the contact sub-system. In this sub-system the user can search and create a new contact entry to match the incoming caller 1350. These choices are expanded in FIGS. 14 and 15, as shown by Reference 'C'. Finally going back to step 1335 the user could be in the e-mail compose sub-system 1355 and are creating an e-mail message to send to the caller or some other person. For one skilled in the art it is obvious that while talking to one person it would be easy to forward a message to another user recounting the phone conversation.

Figure 12:
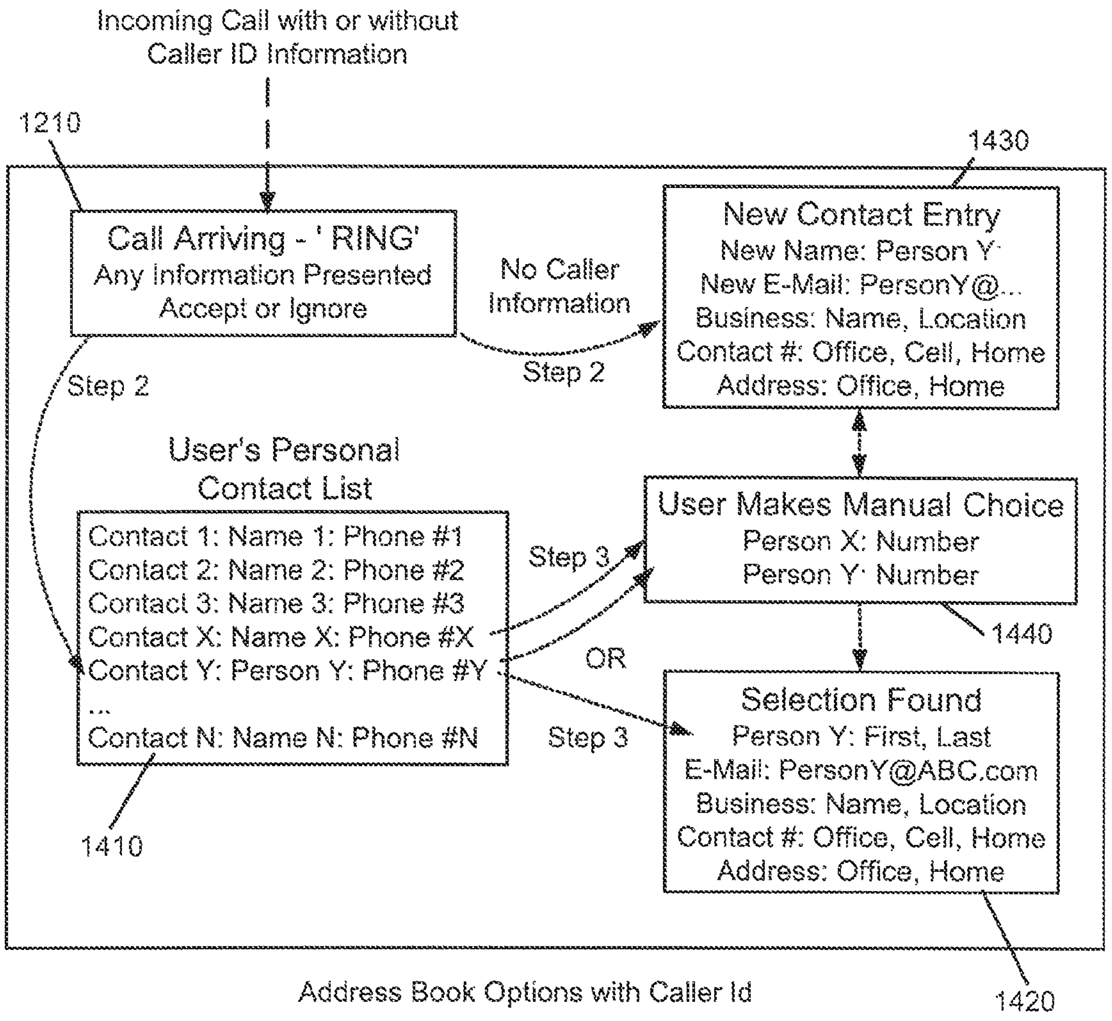
FIG. 12 illustrates a method of creating an address book contact reference based on the caller id information.

Turning now to FIG. 12 there is an illustration of the steps that a user might go through as they enter the contact database area trying to match an incoming caller id to a contract entry. In step 1 the call arrives with or without caller id information 1210. Step 2 may take place in two ways, depending on whether caller id information was present. If there is no caller id information the user is given the option of creating a new contact entry 1430. However, just because there is no Caller Id there may still be a contact entry present for the caller. If this is true the user can override the create choice and move to step 1440 where a manual search for the address book entry can be performed.

The other way step 2 can take place is when the caller Id information is present, a search is started in the contact database 1410. If the search is successful, i.e. one or more entries did match the caller id, then the user is taken to step 1440. If there is a list of matches for the incoming caller, it will be possible for the user, while talking to the other party, to scroll or select the correct contact entry 1440. For one skilled in the art it is clear that this can be in many ways depending on the device and its methods of input. Once selected, or automatically if there is only a single match, the user is taken to the current contact record for the incoming caller 1420. This record will contain all the current information known about the user, which can be further changed during the call itself. For example it might be that the record does not yet have an e-mail address for the caller, at the end of the call the person using the mobile device 100 might prompt the caller for their e-mail address.

The search might also fail to find any contact entry that matches and the user would be taken to manually search for a contact entry 1440. They might decide there is no contact entry, and move to step 1430 to create one. Manually searching for contact entry is also commonly done when making spontaneous outgoing calls. The user might select an entry in the contact list and then scroll to a phone number in the list, i.e. home phone, mobile phone or office phone, and request to make a phone call. This step is commonly done in most mobile phones today and is well know in the field. However, in this invention after the call is made the contact record of the person called is still displayed on the display means of mobile device 100. During this situation the caller can then enter new information about the person they have just called.

Turning now to FIG. 13 this is a data flow diagram of processing an incoming phone call within the contact sub-system. As shown by Reference C at step 1 we have an incoming phone call, illustrated by FIG. 11. In step 1505 the mobile device 100 may have received some information that will be passed to the contact sub-system, via an API call to the contact sub-system. If the Caller Id or phone number is not present 1510 the user is taken to a choice box to create or search for the caller's information 1515. If they want to create a new entry they are presented with a blank contact record to fill in the details 1520 for the caller. Otherwise they are presented with a list of all contacts on the mobile device and they can begin to narrow the list 1525.

If there was Caller Id information present 1510 then a match is attempted with the caller's phone number against all database entries that contain a work phone number 1530. If there are any matches they are collected at 1550 and the process continues until all database entries at checked. Next there is a check of the Caller phone number against the home phone number list 1535 and finally a check is made against all the cell phones in the contact database 1540. Every match is collected and presented to the user 1550 where they can narrow the list 1555 and select the correct match. At any time the user can select the menu within the contact sub-system and move to another sub-system like the call log or e-mail compose sub-system. Once all fields in the contact entry are searched any other fields, such as the notes field, may be searched 1545. Once this is done and all fields are exhausted 1565, the user is presented with a selection of choices which to select the correct entry 1555.

Figure 14:
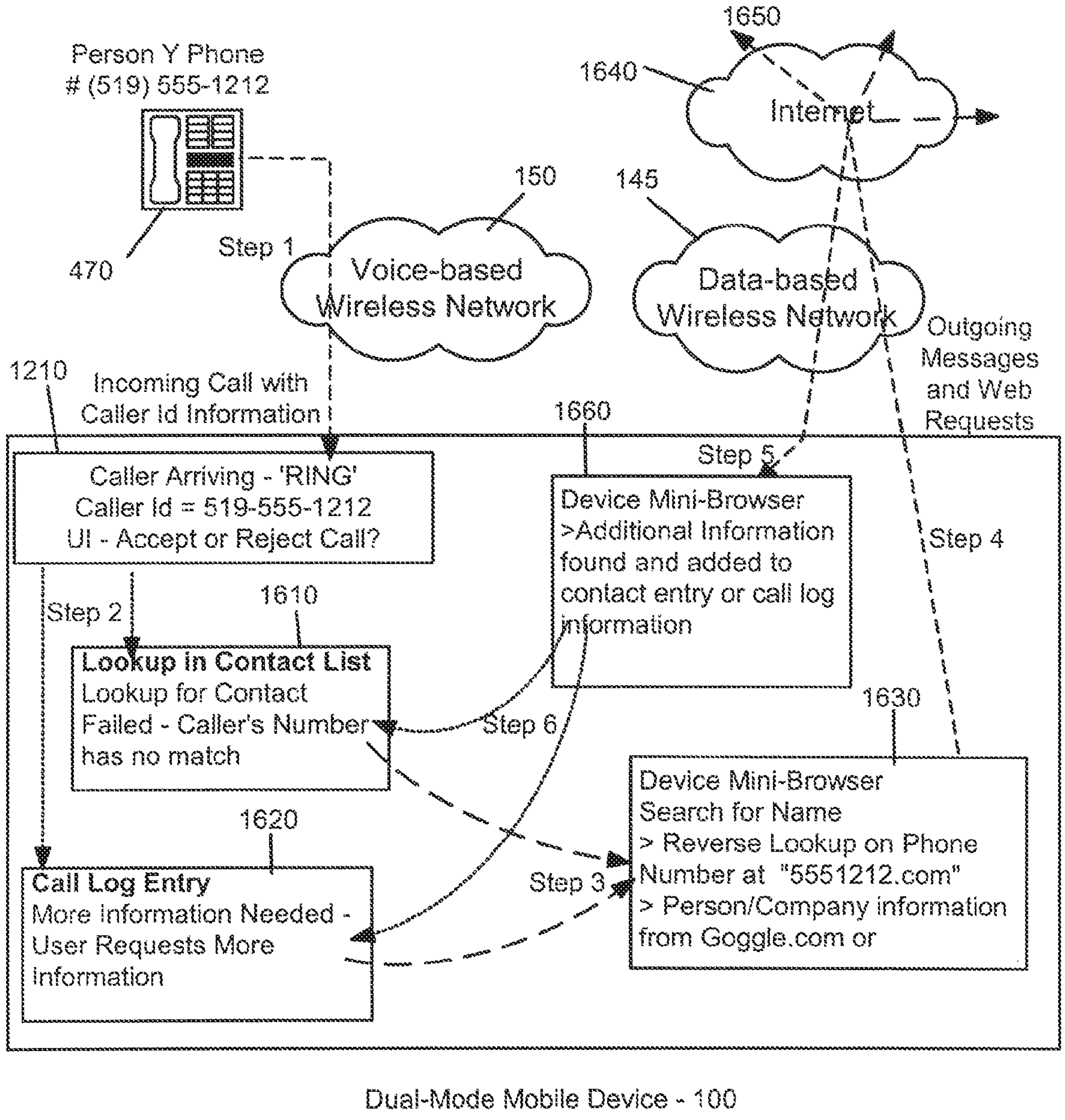
FIG. 14 illustrates a method of using the data component obtain information, associated with caller id information, using the data network.

Turning now to FIG. 14 there is an illustration of another advanced use of handling an incoming voice call with the data component of the mobile device 100. In this illustration the incoming call has only the phone number in the Caller Id and the user wants to uncover more information about the caller. This additional information might be to resolve the true identity of the caller, or perhaps to resolve the name of a crank caller. Even if the name is know the user of the mobile device 100 has the option of getting additional information about the person or their company before committing too much time or money on the call itself Step 1 of FIG. 14 is the arrival of an incoming call that is presented to the user with just the phone number of the incoming caller 1210. FIG. 14 moves to step 2 when the user accepts the call and is placed in the contact list 1610 or the call log 1620 with no more information.

Step 3 of FIG. 14 takes place when the user decides they need more information. By selecting a menu item, or by switching to the browser sub-system the user can request more information from the Internet 1630. The most common method to get more information is by performing a reverse lookup on the phone number 1630. This information can be obtained through a data connection to a reverse lookup directory, and provided seamlessly to the user. Additionally in step 3 the user might request advanced information about the user or the company being referenced in the phone conversation, which can also be obtained using the data component of mobile device 100, and presented to the user seamlessly either prior, after or during the phone call conversation.

Step 4 shows the request going out to the Internet, and step 5 is a response returning 1660. As the user views the information in step 1660 they can either copy and paste this information into the Call Log or Contact entry or perhaps just use the information to deal with the caller. Hence through the single phone call the user has been able to keep the caller, track down their information and react to them with more information all by using a single mobile device 100.

Turning now to FIG. 15 where a unified event list is illustrated. The concept of a unified event listing on a mobile device has never existed until now, and is essential for keeping track of all the different types of events that can take place on a high-speed mobile device capable of supporting a range of media types. The goal of the unified event listing is to allow the user a quick view of what has happened over the past few hours or days and quickly track important events and their time. The unified event listing will have everything that has taken place on the mobile device, including sent and received e-mail messages, calls generated by e-mail or calendar messages, web-page download requests, web forms, secure web pages, calendar messages sent or received, voice messages, phone calls, call logs (Memo-pad entries), video calls, fax messages, printer files, document retrievals and any other event that is important to the user. For one skilled in the art of Third Generation Networks (3G) it is clear that events like video calls, mp3 downloads, ring-tone downloads, fax messages or printer files might be a few years off, but as the number of these message types increase the need for a unified event listing will increase. In the desktop world the concept of unified event listing is sometimes called the Unified Inbox, but the term unified event listing is more accurate to a mobile device.

Figure 15A:
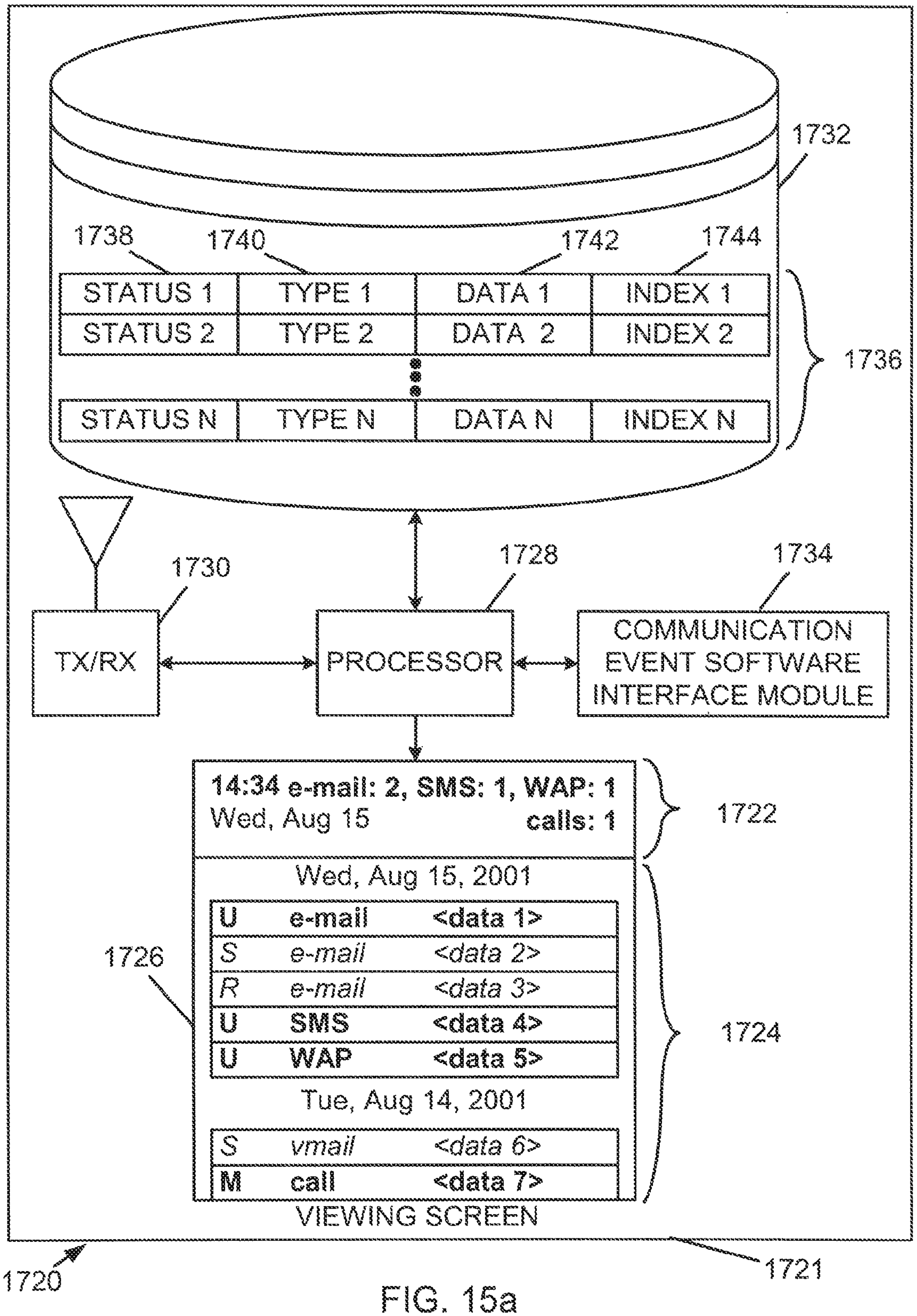
FIG. 15*a* illustrates a method maintaining a unified user interface to track incoming and outgoing messages and activities; and, FIG. 15*b* is an illustration of another embodiment of 15*a*.

FIG. 15*a* shows an exemplary unified user interface 1720 for a wireless device 100 that displays current communication event summary 1722 unified with select stored communication events 1724. The user interface 1720 includes a viewing screen 1726, a processor 1728, a transceiver 1730, and a memory device 1732. The user interface 1720 also includes a communication event software interface module 1734 that is executed by the processor 1728. Operationally, the communication event software interface module 1734 stores at least incoming and outgoing communication events 1736 in the memory device 1732, and enables a user to simultaneously view the current communication event summary 1722 and the select stored communication events 1724.

The communication event software interface module 1734 preferably saves and indexes every communication event transmitted or received by the wireless device 100. In an alternative embodiment, the communication event software interface module 1734 may give the user the option to choose which communication events to save and which to discard.

Each stored communication event 1736 preferably includes a communication event status 1738 (unread, sent, read, missed, pending, incoming, outgoing, etc.) and both a communication event type 1740 (call, e-mail, SMS, WAP, calendar, HTTP, etc.) and communication event data 1742 (caller id, header information, outside number, URL, subject line, etc.). Each stored communication event 1736 preferably also includes an index 1744 that permits the processor to cross reference additional data associated with the respective communication event or index. Additional data may include (1) more header information and the message body of the e-mail message when an e-mail message is the communication event, (2) the call log details such as notes taken by the user of the mobile device, the date and time of the call, the duration of the call, to whom the call was made to, from whom the call was made, with respect to a phone conversation taken place via the mobile device, (3) the web page fetched from a browser on the mobile device, (4) the results of a WAP enabled pull of data.

Select communication events 1724 are displayed on the viewing screen 1726. In FIG. 15*a*, for example, the status of each select communication event is represented on the viewing screen 1726 using a single letter, as well as using bold type to emphasize communication events which have not yet been attended to by the user. Conversely, italic type is used to represent communication events that have been attended to by the user, although attended events may also be omitted from the display to further emphasize the select communication events. Furthermore, the type of each select communication event is represented on the viewing screen 1726 in FIG. 15*a*, for example, by an icon 1727 (alternatively by a short word or acronym such as email, SMS, WAP, call). Furthermore, the data of each select communication event is represented on the viewing screen 1726 in FIG. 15*a*, for example, in the form of a short textual representation. Further still, the select communication events are represented on the viewing screen 1726 in FIG. 15*a*, for example, in the form of a table. It should be understood, however, that the user interface 1720 is not limited to use with those representations, or those illustrated types of communication events. Rather, the user interface 1720 may be used with any form of communication event, such as e-mail communication events, SMS communication events, web communication events, WAP communication events, as well as other data, voice, and video communication events. It is to be understood that the user of the mobile device 100 may scroll through the listing of the select communication events and determine which of these events he desires to act further on by requesting menu selection user interface as illustrated in FIG. 2*b*. The user would then choose one of the action items presented in the menu selection user interface to retrieve more information about the selected communication event or act on the selected communication event.

In addition to the status 1738, type 1740, and data 1742, the communication event software interface module 1734 may also attach some type of indexing data 1744 to each communication event, such as an ordinal value or a timestamp indicating when the communication event was transmitted or received.

Figure 15B:
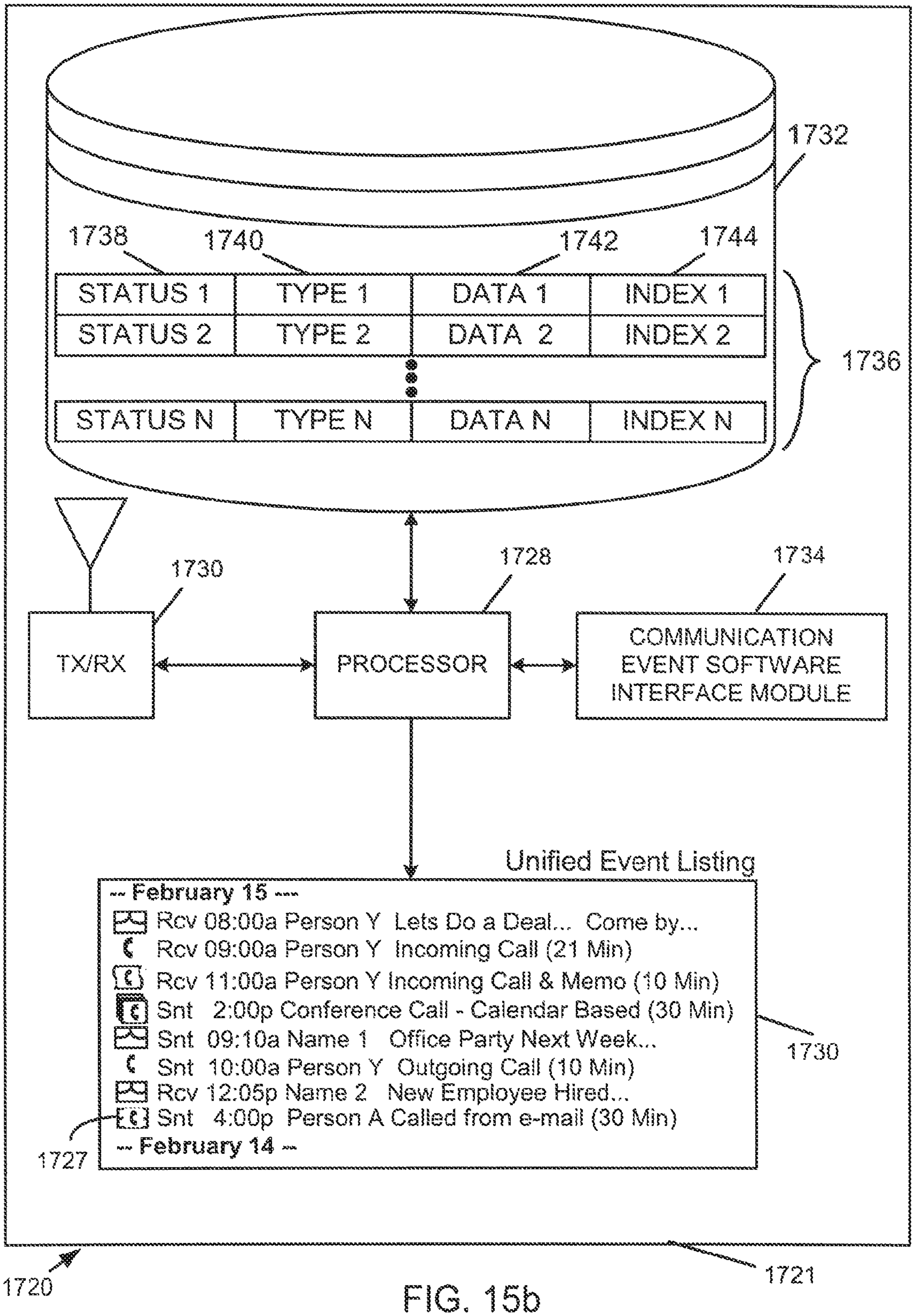

In addition to saving and indexing incoming and outgoing communication events, the communication event software interface module 1734 filters the stored communication events 1736 to select communication events relating to pre-set criteria. FIG. 15*b* illustrates another embodiment of how select communication events 1724 are displayed on the viewing screen 1726. By way of example, the latest three communication events will be briefly described. The first is an e-mail message received at the mobile device and sent from Person Y. The email icon 1727 is shown and acronym RCV is used to indicate it was received versus sent from the mobile. The time 08:00a indicates the time it was received at the mobile device. The sender's name appears next to the subject line of the email message. The next communication event is an incoming telephone voice call received at the mobile device. In this instance, a call icon 1727 appears. The acronym RCV again appears, the time the call was received, the caller name (alternatively or additionally, the telephone number of the caller), and duration of the call all appear. The next communication event is an outgoing telephone voice call. In this instance, the call icon 1727 is indicative of the fact that a memo (or notes) made by the user of the mobile device is also available should the user open this communication event to read more information.

As once skilled in the art of user interfaces can appreciate there would be many ways to present the unified user interface (UUI). One goal of this UUI is for the user to review important events at any time they like. It would also be a central location the user would go when the mobile device 100 notifies them that something has been received. The lists shown in FIGS. 15*a* and 15*b* are examples, but many other UI representations could be used. Preferably, the information to be presented includes, date and time of the event, type of event, direction of the event, i.e. Sent or Received, and a summary of information that might help with a quick glance at the event. In this example we have summarized all the events by day, and a leading icon is used to indicate the type of event, shown as an envelop for e-mail events and a phone for phone events. This field is then followed by a direction indicator, either Snt or Rcv and a time for when the event took place. Finally there is summary information like the person that sent the message or make the phone call, and the subject line, or call duration. It is clear to one skilled in the art that this summary information could contain a range of other information contained within the event not shown in this Figure.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method comprising:

receiving, by a mobile communication device over a wireless connection, a data item;

displaying the data item on a viewing screen of the mobile communication device using a data viewer;

while displaying the data item on the viewing screen, receiving, by the mobile communication device, user input identifying a position within the data item and selecting an option to make a call;

responsive to the user input, detecting, by the mobile communication device, a phone number in the data item, the detecting including scanning characters near the identified position to parse the data item to identify a complete phone number; and initiating, by the mobile communication device, a call to the detected phone number.

2. The method of claim 1 further comprising displaying a menu of communication options, wherein the user input selecting the option to make a call corresponds to a selection of an option from the displayed menu.

3. The method of claim 1 wherein the detection of the phone number in the data item includes scanning characters in either direction of the identified position.

4. The method of claim 1 wherein the detection of the phone number in the data item includes determining whether the identified position corresponds to an address field of the data item.

5. The method of claim 1 wherein the detection of the phone number in the data item includes determining whether the identified position corresponds to a phone character.

6. The method of claim 5 further comprising determining whether characters adjacent the phone character form the complete phone number.

7. The method of claim 1 further comprising identifying the complete phone number is complete based on syntax.

8. A mobile communication device comprising one or more processors configured to:

receive, by the mobile communication device over a wireless connection, a data item;

display, using a data viewer, the data item on a viewing screen of the mobile communication device;

while displaying the data item on the viewing screen, receive, by the mobile communication device, user input identifying a position within the data item and selecting an option to make a call;

responsive to the user input, detect, by the mobile communication device, a phone number in the data item, the detection including scanning characters near the identified position to parse the data item to identify a complete phone number; and initiate, by the mobile communication device, a call to the detected phone number.

9. The mobile communication device of claim 8, wherein the one or more processors are further configured to display a menu of communication options, and wherein the user input selecting the option to make a call corresponds to a selection of an option from the displayed menu.

10. The mobile communication device of claim 8 wherein the detection of the phone number in the data item includes scanning characters in either direction of the identified position.

11. The mobile communication device of claim 8 wherein the detection of the phone number in the data item includes determining whether the identified position corresponds to an address field of the data item.

12. The mobile communication device of claim 8 wherein the detection of the phone number in the data item includes determining whether the identified position corresponds to a phone character.

13. The mobile communication device of claim 12, wherein the one or more processors are further configured to determine whether characters adjacent the phone character form the complete phone number.

14. The mobile communication device of claim 8, wherein the one or more processors are further configured to identify the complete phone number is complete based on syntax.

15. A non-transitory computer-readable medium storing instructions that, when executed by one or more processors of a mobile communication device, cause the mobile communication device to:

receive, by a mobile communication device over a wireless connection, a data item;

display, using a data viewer, the data item on a viewing screen of the mobile communication device;

while displaying the data item on the viewing screen, receive, by the mobile communication device, user input identifying a position within the data item and selecting an option to make a call;

responsive to the user input, detect, by the mobile communication device, a phone number in the data item, the detection including scanning characters near the identified position to parse the data item to identify a complete phone number; and initiate, by the mobile communication device, a call to the detected phone number.

16. The non-transitory computer-readable medium of claim 15, wherein the instructions, when executed by one or more processors of the mobile communication device, further cause the mobile communication device to:

display a menu of communication options, and wherein the user input selecting the option to make a call corresponds to a selection of an option from the displayed menu.

17. The non-transitory computer-readable medium of claim 15 wherein the detection of the phone number in the data item includes scanning characters in either direction of the identified position.

18. The non-transitory computer-readable medium of claim 15 wherein the detection of the phone number in the data item includes determining whether the identified position corresponds to an address field of the data item.

19. The non-transitory computer-readable medium of claim 15 wherein the detection of the phone number in the data item includes determining whether the identified position corresponds to a phone character.

20. The non-transitory computer-readable medium of claim 19, wherein the instructions, when executed by one or more processors of the mobile communication device, further cause the mobile communication device to:

determine whether characters adjacent the phone character form the complete phone number.

21. The method of claim 1, wherein the data item includes one of an email message, a voice mail message, a calendar event, a calendar message, a to do item, a to do list, an address book entry, a work item, a memo-pad message, expense report data, a database record, an HTTP page, an XML page, a WML page, an HDML page, or a data message.

22. The method of claim 1, wherein the data viewer includes one of an e-mail viewer, a calendar viewer, a to do list viewer, a task viewer, an expense report viewer, a database viewer, an Internet browser, or a Wireless Access Protocol (WAP) browser.

* * * * *